(12) United States Patent
Icho et al.

(10) Patent No.: US 9,183,437 B2
(45) Date of Patent: Nov. 10, 2015

(54) AREA SEARCH DEVICE AND AREA SEARCH METHOD

(75) Inventors: Keiji Icho, Osaka (JP); Yuichi Kobayakawa, Osaka (JP); Ryota Tsukidate, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 411 days.

(21) Appl. No.: 13/806,107

(22) PCT Filed: Apr. 19, 2012

(86) PCT No.: PCT/JP2012/002713
§ 371 (c)(1),
(2), (4) Date: Dec. 20, 2012

(87) PCT Pub. No.: WO2012/144216
PCT Pub. Date: Oct. 26, 2012

(65) Prior Publication Data
US 2013/0094718 A1    Apr. 18, 2013

Related U.S. Application Data

(63) Continuation of application No. 13/092,609, filed on Apr. 22, 2011, now abandoned.

(51) Int. Cl.
*G06F 17/30* (2006.01)
*G06K 9/00* (2006.01)
(52) U.S. Cl.
CPC ...... *G06K 9/00476* (2013.01); *G06F 17/30241* (2013.01)
(58) Field of Classification Search
None
See application file for complete search history.

(56) References Cited

U.S. PATENT DOCUMENTS

| 7,373,246 | B2 | 5/2008 | O'Clair |
| 2007/0203897 | A1 | 8/2007 | Ueno et al. |
| 2008/0147607 | A1* | 6/2008 | Moore et al. ...................... 707/3 |
| 2008/0291217 | A1 | 11/2008 | Vincent et al. |
| 2009/0177381 | A1* | 7/2009 | Taniguchi et al. ............ 701/208 |
| 2009/0177384 | A1 | 7/2009 | Walder |
| 2011/0099180 | A1* | 4/2011 | Arrasvuori .................... 707/754 |
| 2011/0238690 | A1* | 9/2011 | Arrasvuori et al. ........... 707/769 |

FOREIGN PATENT DOCUMENTS

| JP | 2004-152187 A | 5/2004 |
| JP | 2007-219615 A | 8/2007 |

* cited by examiner

*Primary Examiner* — Kee M Tung
*Assistant Examiner* — Ryan D McCulley
(74) *Attorney, Agent, or Firm* — Harness, Dickey & Pierce, P.L.C.

(57) ABSTRACT

A dynamic area search device includes: a search condition obtainment unit that obtains information on search objects and a condition for a search scope for searching for the search objects; an on-map operation detection unit that detects a first user-specified point on a map displayed on a display; a content search unit that searches for elements associated with locations on the map, based on the information on the search objects; a display area determination unit that determines a first area that has the user-specified point at the center, and includes, among the elements searched for by the content search unit, elements that meet the condition for the search scope; and an area boundary display unit configured to dynamically display, on the map, the user-specified point and the first area determined by the display area determination unit.

18 Claims, 17 Drawing Sheets

AREA SEARCH DEVICE AND AREA SEARCH METHOD

TECHNICAL FIELD

The present invention relates to an area search device and an area search method.

BACKGROUND ART

Many techniques have been proposed for viewing and checking information on a map displayed on a website. Typical techniques are techniques for displaying, in a region on or outside a map, information in a specified area, or extracting information such as the content of a specified point to display the details of the extracted information (e.g., Patent Literature 1).

For instance, a user searches, on the website, for retailers near a location of interest such as a city or a location near a particular zip code. A list of retailers that meet the search condition appears on or outside a map including the area of user's interest and its periphery. Such techniques allow the user to view and check the desired information.

CITATION LIST

Patent Literature

[PTL 1] U.S. Pat. No. 7,373,246

SUMMARY OF INVENTION

Technical Problem

However, the related art such as Patent Literature 1 has a problem that a user has to repeatedly specify search conditions such as a search scope on a map and check search results in order to obtain the desired information.

Therefore, the present invention has been made in view of the above problem, and an object of the present invention is to provide an area search device and an area search method for intuitively and dynamically displaying an area boundary that meets conditions in conjunction with user's operation on a map.

Solution to Problem

To achieve the above object, an area search device according to an aspect of the present invention includes: a search condition obtainment unit that obtains information on search objects and a condition for a search scope for searching for the search objects, the information and the condition being inputted by a user; a detection unit that detects a first user-specified point on a map displayed on a display that is a point specified by a user; a content search unit that searches for elements associated with locations on the map, based on the information on the search objects; a determination unit that determines a first area that has the user-specified point at the center, and includes, among the elements searched for by the content search unit, elements that meet the condition for the search scope; and an area boundary display unit that dynamically displays, on the map, the user-specified point and the first area determined by the determination unit.

It should be noted that overall or specific aspects of the above may be achieved by a system, a method, an integrated circuit, a computer program, or a recording medium, or may be achieved by any combination among the system, the method, the integrated circuit, the computer program, and the recording medium.

Advantageous Effects of Invention

Thus, according to the present invention, it is possible to achieve an area search device and an area search method intuitively and dynamically displaying an area boundary that meets conditions in conjunction with user's operation on the map.

DESCRIPTION OF EMBODIMENTS

Figure 1:
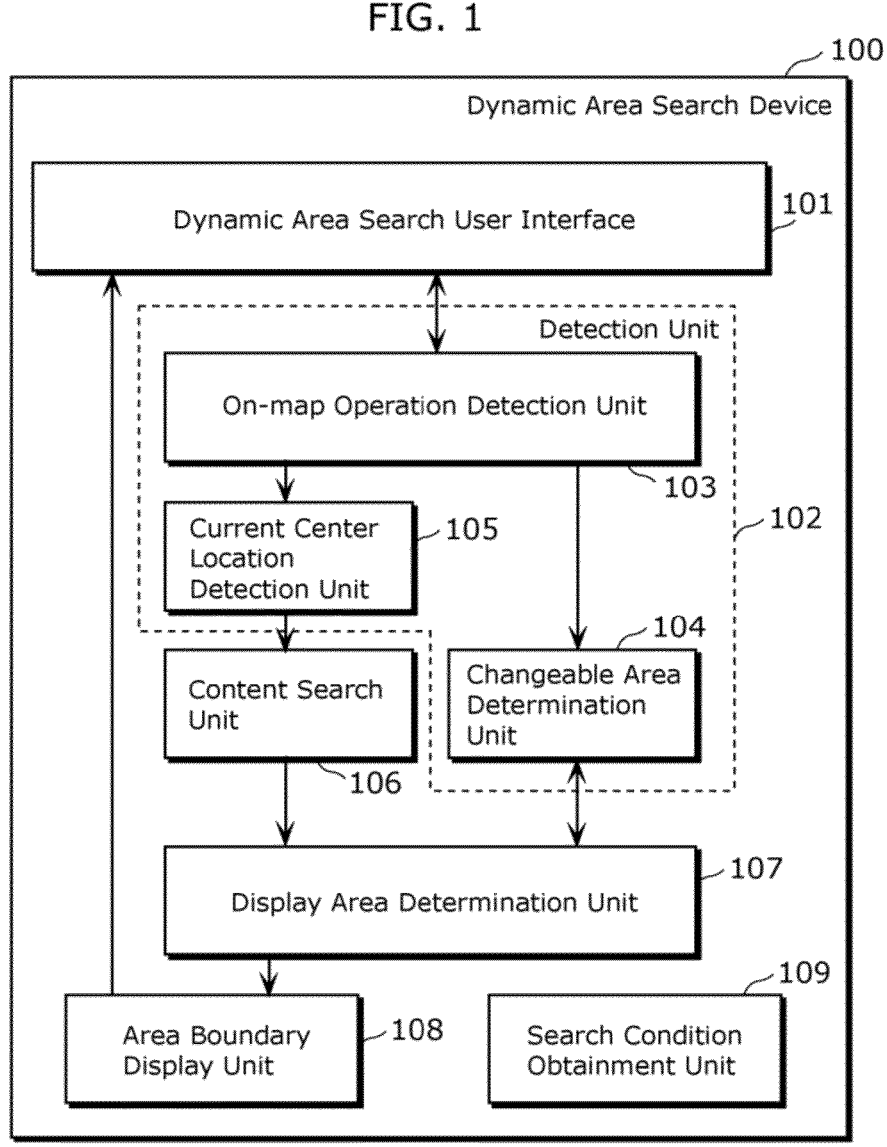
FIG. 1 is a block diagram illustrating an example of the configuration of a dynamic area search device according to the first embodiment.

To solve the above problem, an area search device according to an aspect of the present invention includes: a search condition obtainment unit that obtains information on search objects and a condition for a search scope for searching for the search objects, the information and the condition being inputted by a user; a detection unit that detects a first user-specified point on a map displayed on a display that is a point specified by a user; a content search unit that searches for elements associated with locations on the map, based on the information on the search objects; a determination unit that determines a first area that has the user-specified point at the center, and includes, among the elements searched for by the content search unit, elements that meet the condition for the search scope; and an area boundary display unit that dynamically displays, on the map, the user-specified point and the first area determined by the determination unit.

This enables to achieve an area search device that intuitively and dynamically displays an area boundary that meets conditions, in conjunction with a user operation on a map.

Here, for example, the condition for the search scope may be the number of the search objects, and the determination unit may determine a first area that has the user-specified point at the center and includes, among the elements searched for by the content search unit, elements, the number of which is identical to the number of the search objects.

For example, the condition for the search scope may be the number of the search objects, the determination unit may determine (i) a first area that has the user-specified point at the center and includes, among the elements searched for by the content search unit, elements of the total number of the search objects and (ii) layer areas each including a fixed number of elements which is within the total number of the search objects, and the area boundary display unit may dynamically display, on the map, the user-specified point and the layer areas determined by the determination unit.

For example, the condition for the search scope may be a total amount of information of the search objects, and the determination unit may determine a first area that has the user-specified point at the center and includes, among the elements searched for by the content search unit, elements, a total amount of information of which is identical to the total amount of information of the search objects.

For example, the determination unit may determine a circle area having the user-specified point at the center as the first area.

For example, the map may be a geographical map, and the determination unit may determine, as the first area, an area that has the user-specified point at the center and boundary points at geographically same distances from the user-specified point.

For example, the detection unit may further detect an area size changing operation that indicates expansion or reduction of the first area on the map, the first area being displayed on the display by the area boundary display unit, when the detection unit detects the area size changing operation, the search condition obtainment unit may update the condition for the search scope to search for the search objects so as to respond to the area size changing operation, the determination unit may determine a second area that has the user-specified area at the center and includes, among the elements searched for by the content search unit, elements that meet the condition for the search scope updated by the search condition obtainment unit, and the area boundary display unit may dynamically display, on the map, the first user-specified point and the second area determined by the determination unit to expand or reduce the first area on the map displayed on the display.

For example, the detection unit may detect, on the map displayed on the display, a second user-specified point that is a point different from the first user-specified point and is a point specified by a user, the determination unit may determine a second area that has the second user-specified point at the center and includes, among the elements searched for by the content search unit, the elements that meet the condition for the search scope, and the area boundary display unit may dynamically display, on the map, the second user-specified point and the second area determined by the determination unit.

For example, the detection unit may further detect, on the map displayed on the display, a second user-specified point that is a point different from the first use-specified point and is a point specified by the user, the determination unit may further determine a second area that has the second user-specified point at the center and includes, among the elements searched for by the content search unit, elements that meet the condition for the search scope, and the area boundary display unit may dynamically display, on the map, the second user-specified point and the second area determined by the determination unit, together with the user-specified point and the first area determined by the determination unit.

For example, the area boundary display unit may (i) reduce the map when a size of the first area is a predetermined value or more, and (ii) expand the map when the size of the first area is smaller than the predetermined value.

For example, (i) when dynamically displaying, on the map, the first user-specified point and the first area determined by the determination unit, the area boundary display unit may display the condition for the search scope in the first area, and (ii) when dynamically displaying, on the map, the second user-specified point and the second area determined by the determination unit, the area boundary display unit may display the condition for the search scope in the second area.

For example, an area search device according to an aspect of the present invention may further include a content area display unit that displays, in a content area of the display, list information items indicating elements included in the first area displayed by the area boundary display unit.

For example, an area search device according to an aspect of the present invention may further include a display content determination unit that determines the number of the list information items to be displayed in the content area and the display size of each of the list information items, in which the display content determination unit may determine the number and the display size of the list information items to be displayed in the content area, based on the number of the elements included in the first area displayed by the area boundary display unit, and the content area display unit may display, in the content area of the display, the list information items, the number and the display size of which are determined by the display content determination unit.

For example, an area search device according to an aspect of the present invention further includes: a content area operation detection unit that detects a user operation on the content area, in which the display content determination unit may further determine the number of the list information items to be displayed in the content area and the display size of each of the list information items, based on the user operation detected by the content area operation detection unit, the content area display unit may display, in the content area of the display, the list information items, the number and the display size of which are determined by the display content determination unit, the search condition obtainment unit may further update the condition for the search scope to search for the search objects so as to include only the elements that correspond to the list information items displayed by the content area display, the determination unit may determine the second area that has the user-specified point at the center and includes, among the elements searched for by the content search unit, elements that meet the condition for the search scope updated by the search condition obtainment unit, and the area boundary display unit may dynamically display, on the map, the first user-specified point and the second area determined by the determination unit.

For example, the user operation detected by the content area operation detection unit may be a scroll operation which allows the user to scroll the list information items displayed in the content area, the display content determination unit may further determine the number of the list information items to be displayed in the content area and the display size of each of the list information items, based on the scroll operation detected by the content area operation detection unit, and the content area display unit may display, in the content area of the display, the list information items scrolled in the scroll operation, the number and the display size of which are determined by the display content determination unit.

For example, the display may be a touch screen display, the detection unit may detect a user operation on the display by detecting the area size changing operation on the touch screen display, and the area size changing operation may be an operation to perform a touch gesture to expand or reduce the first area on the map displayed on the display while performing a touch gesture to press the first user-specified point.

For example, the dynamic area search device may further include the display, the display may be a touch screen display, and the detection unit may detect the user operation on the display by detecting an operation on the touch screen display.

To solve the above problem, an area search method includes steps of: (i) obtaining information on search objects and a condition for a search scope to search for the search objects, the information and the condition being inputted by a user; (ii) detecting a first user-specified point on a map displayed on a display that is a point specified by a user; (iii) searching elements associated with locations on the map, based on information on the search objects; (iv) determining a first area that has the user-specified point at the center and includes, among the elements searched for in step (iv), elements that meet a condition for the search scope; and (v) dynamically displaying, on the map, the user-specified point and the first area determined by the determination unit.

It should be noted that each of the exemplary embodiments described below shows a general or specific example. The numerical values, shapes, materials, structural elements, the arrangement and connection of the structural elements, steps, the processing order of the steps and so on shown in the following exemplary embodiments are mere examples, and are not intended to limit the present disclosure. Therefore, among the structural elements in the following exemplary embodiments, structural elements not recited in any one of the independent claims representing superordinate concept are described as arbitrary structural elements.

Moreover, the following drawings are used for illustrative purposes only to exemplify selected embodiments, but not all possible embodiments. Same reference numerals indicate corresponding parts through some figures in the drawings.

Embodiment 1

FIG. 1 is a block diagram illustrating an example of the configuration of a dynamic area search device according to the first embodiment. A dynamic area search device 100 shown in FIG. 1 includes a dynamic area search user interface 101, a detection unit 102, a content search unit 106, a display area determination unit 107, an area boundary display unit 108, and a search condition obtainment unit 109.

The dynamic area search user interface 101 is an interface that supports interaction with a user, and processes ongoing interaction between the user and a display screen such as a display. For example, the dynamic area search user interface 101 obtains from the user, a search criteria such as a user-specified point that is specified by the user as a point of interest on a map. For example, the dynamic area search user interface 101 also outputs the boundary of an area in which a search result dynamically appears on a map displayed on a display screen, in conjunction with update of the display screen such as a display.

Although the following assumes that a map is a geographical map to simplify description, the map is not limited to the geographical map. The map may illustrate a bird's-eye view of colors such as hue or a mapping of value or content of something as a two-dimensional or three-dimensional semantic space.

The search condition obtainment unit 109 obtains information on search objects and conditions for a search scope for searching for the search objects. Here, the information and the conditions are inputted by a user. Here, information on the search objects includes, for example, an index, items and keywords for searching content (elements) that the user wishes to search for. Moreover, the conditions for the search scope are, for example, conditions that limit the number, total capacity, range and sizes of the search objects.

The detection unit 102 includes an on-map operation detection unit 103, a changeable area determination unit 104, and a current center location detection unit 105. The detection unit 102 detects a first user-specified point that is a point specified by a user and associated with a location on a map displayed on a display screen.

For example, ongoing interface between the user and a display is transmitted to the on-map operation detection unit 103 by the dynamic area search user interface 101, and the on-map operation detection unit 103 detects user operations on the map displayed on the display screen. The changeable area determination unit 104 determines when the user changes the size of a dynamic area on the map. The current center location detection unit 105 detects, for example, a change or an addition of a user-specified point by detecting the user-specified point that is a point specified by the user.

The content search unit 106 detects elements associated with locations on the map displayed on the display screen, based on information on search objects.

The display area determination unit 107 is an example of a determination unit, and determines a first area that has a user-specified point at the center and includes, among elements searched for by the content search unit 106, elements that meet the conditions for the search scope.

The area boundary display unit 108 dynamically displays, on the map displayed on the display screen, a user-specified point and a first area determined by the display area determination unit 107, via the dynamic area search user interface 101.

The configuration of the dynamic area search device 100 is described above.

With reference to FIGS. 2A to 7, the following describes examples of dynamic areas that the dynamic area search device 100 displays on the map on a display 170 (display screen). It should be noted that the following examples are described with assumption that the display 170 is a touch panel display and a user operation is detected by detecting a touch gesture of a user.

Figure 2A:
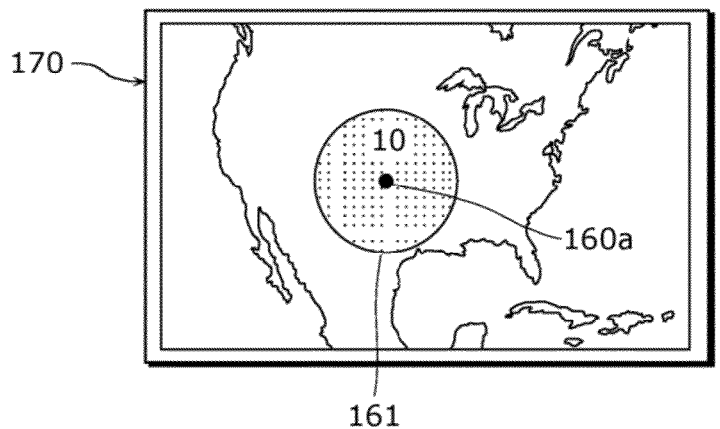
FIG. 2A illustrates an example of a dynamic area that a dynamic area search device according to the first embodiment displays on a display.
Figure 2B:
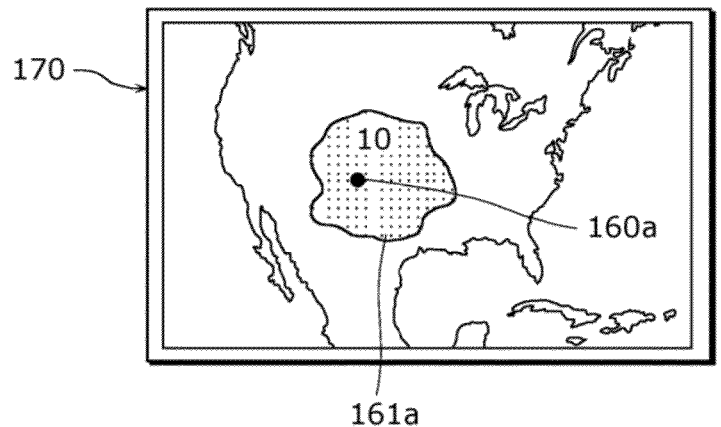
FIG. 2B illustrates an example of a dynamic area that a dynamic area search device according to the first embodiment displays on a display.

FIGS. 2A and 2B illustrate examples of dynamic areas that a dynamic area search device according to the present embodiment displays on the display 170.

FIG. 2A illustrates an example that when a condition for a search scope is the number of search objects (e.g., 10), a circle area 161 having a user-specified point 160a as the center point is displayed on the map on the display 170 (here, on the map of the North American continent). Here, for example, when the search objects are retailers, the circle area 161 shows an area including 10 retailers. Moreover, in FIG. 2A, the number of the search objects (e.g., 10) appears in a given location of the circle area 161 on the map.

Specifically, in the dynamic area search device 100, when the condition for the search scope is the number of the search objects (e.g., 10), the display area determination unit 107 determines the area 161 having the user-specified point 160a at the center and including, among elements searched for by the content search unit 106, elements, the number of which is identical to the number of the search objects (e.g., 10). The area boundary display unit 108 dynamically displays the user-specified point and the area 161 determined by the display area determination unit 107 on the map displayed on the display 170. Moreover, when dynamically displaying, on the map, the user-specified point 160a and the area 161 determined by the display area determination unit 107, the area boundary display unit 108 displays a condition for the search scope on the area 161.

Here, the display area determination unit 107 determines the area 161 as the circle area 161 having the user-specified point 160a at the center. In other words, the display area determination unit 107 determines the determined circle area 161 as a circle area having, at the center, the user-specified point 160a that is a point of user's geographical interest on the map or the periphery of the user-specified point 160a, and having, on the circumference, an element in the furthest location from the point of geographical interest among searched elements.

It should be noted that the display area determination unit 107 may determine the area 161 as an area 161a of indefinite shape that has the user-specified point 160a at the center and is drawn with features on the map (such as a distance and a walking time). In this case, the area boundary display unit 108, as shown in FIG. 2B, dynamically displays, on the map on the display 170, the user-specified point 160a and the area 161a of indefinite shape determined by the display area determination unit 107.

It should be noted that when the area 161a of indefinite shape is determined, a change in altitude on the geographical map from the user-specified point 160a may be, for example, taken into account. Moreover, the area 161a of indefinite shape may be determined by taking into account a two-dimensional distance from the user-specified point 160a to the furthest element (search target element) and using a change in altitude from the user-specified point in a predetermined direction. In this case, the boundary of the area is closer to the user-specified point 160a in a direction in which there is a large change in altitude than in a direction in which there is a small change in altitude, resulting in the indefinite shape of the area 161a.

Moreover, a traveling time (such as a walking time) from the user-specified point 160a may be taken into account to determine the area 161a. In this case, by taking into account a time required to travel from the user-specified point 160a to the furthest element (search target element), distances from the user-specified point 160a to the remaining boundary points of the region 161a can be determined by a traveling time. It should be noted that as being a well-known art, a calculation of, for example, a traveling time is omitted here.

Figure 3A:
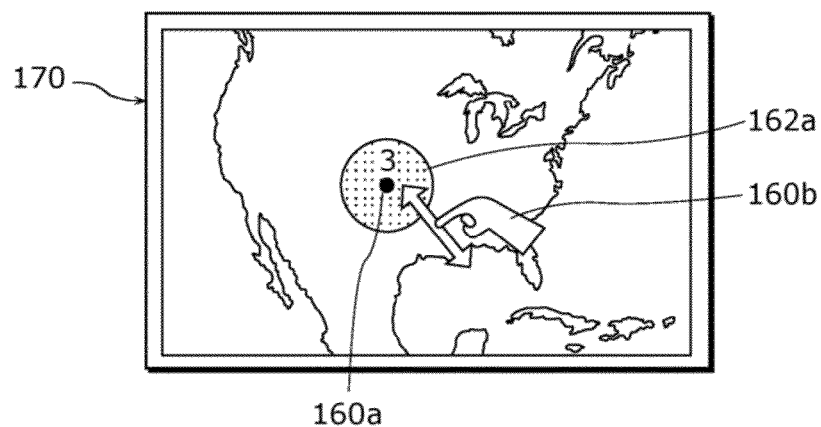
FIG. 3A illustrates an example of the expansion or reduction of a dynamic area that a dynamic area search device according to the first embodiment displays on a display.
Figure 3B:
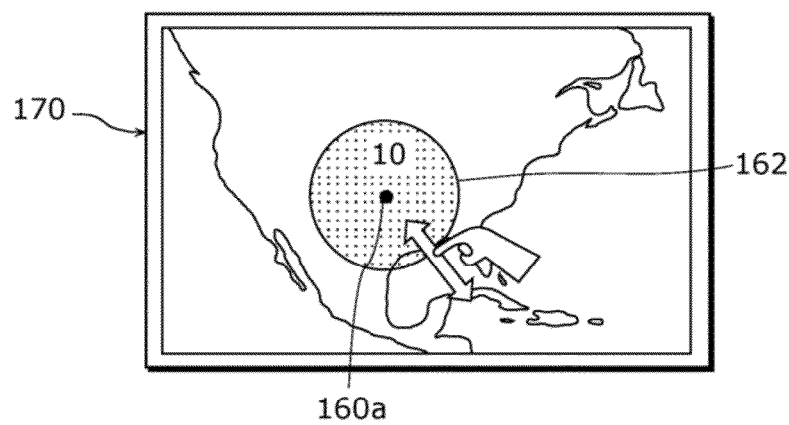
FIG. 3B illustrates an example of the expansion or reduction of a dynamic area that a dynamic area search device according to the first embodiment displays on a display.
Figure 3C:
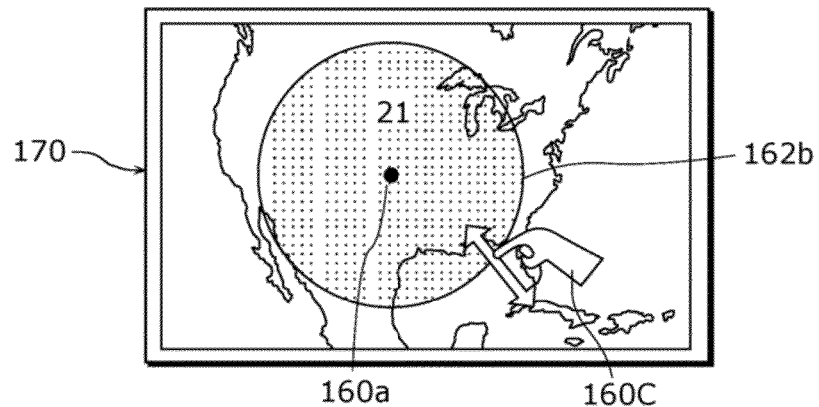
FIG. 3C illustrates an example of the expansion or reduction of a dynamic area that a dynamic area search device according to the first embodiment displays on a display.

FIGS. 3A to 3C illustrate examples of the expansion and reduction of a dynamic area that the dynamic area search device according to the present embodiment displays on the display 170.

FIG. 3A shows an area 162a having the user-specified point 160a at the center and elements, the number of which is identical to the number of search objects (here, 3). FIG. 3B shows an area 162 having the user-specified point 160a at the center and elements, the number of which is identical to the number of search objects (here, 10). FIG. 3C shows an area 162b having the user-specified point 160a at the center and elements, the number of which is identical to the number of search objects (here, 21).

FIGS. 3A to 3B show how the 162a shown in FIG. 3A expands to the area 162 shown in FIG. 3B by user's operation to expand the area 162a (a touch gesture movement 160b). Moreover, FIGS. 3B and 3C shows how the area 162b shown in FIG. 3B reduces to the area 162 shown in FIG. 3B by user's operation to reduce the area 162B (a touch gesture movement 160C).

Specifically, the detection unit 102 of the dynamic area search device 100 further detects an area size changing operation that indicates the expansion or reduction of a first area (the area 162) on a map that the area boundary display unit 108 displays on the display 170. When the detection unit 102 detects the area size changing operation, the search condition obtainment unit 109 updates conditions for a search scope for searching for search objects in order to respond to the detected area size changing operation. The display area determination unit 107 determines a second area (the area 162a and the area 162b) having the user-specified point 160a at the center and including, among elements searched for by the content search unit 106, elements that meet the conditions for the search scope which are updated by the search condition obtainment unit 109. It is possible to expand or reduce the first area on the map displayed on the display 170 by the area boundary display unit 108 dynamically displaying, on a map, the user-specified point 160a and the second area determined by the display area determination unit 107 in such a way.

Here, the detection unit 102 detects user's operations on the display 170 by detecting the area size changing operation on the display 170. In the area size changing operation, touch gesture movements of pressing the user-specified point 160a and expanding or reducing the first area on the map displayed on the display 170 are performed.

Figure 4A:
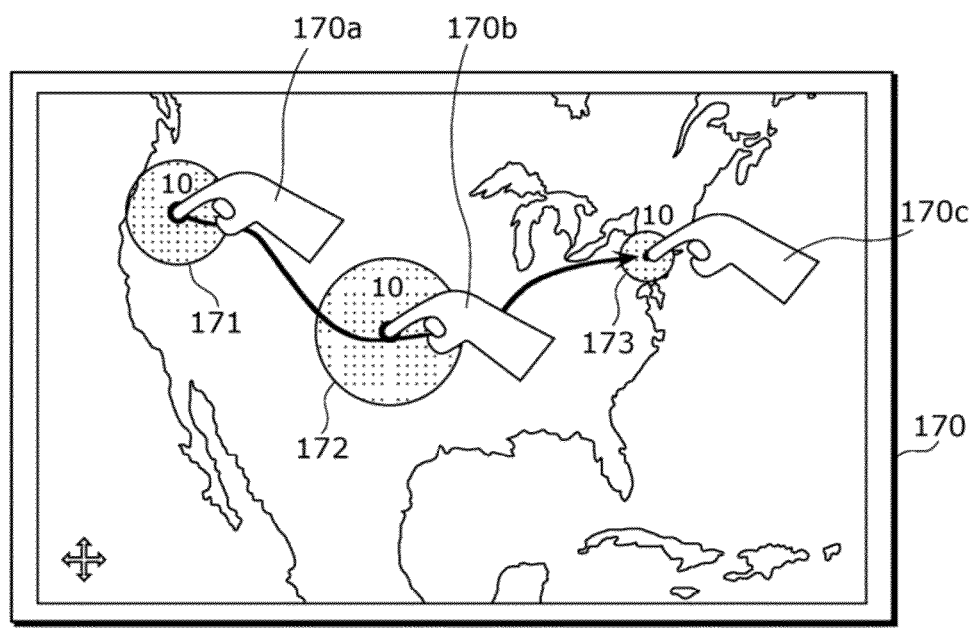
FIG. 4A illustrates an example of a dynamic area that a dynamic area search device according to the first embodiment displays on a display when a user-specified point is changed.
Figure 4B:
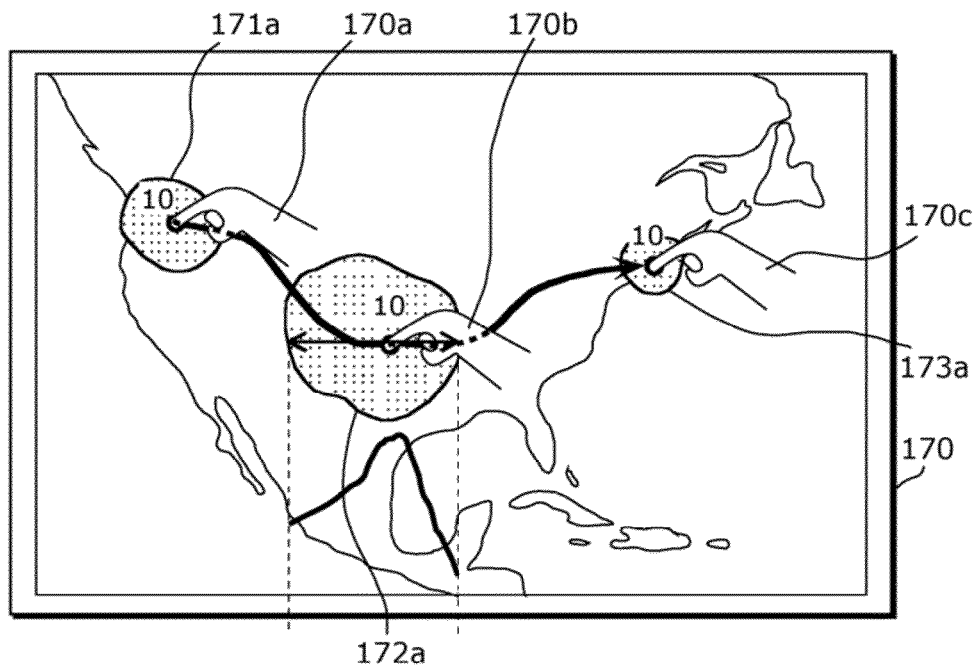
FIG. 4B illustrates an example of a dynamic area that a dynamic area search device according to the first embodiment displays on a display when a user-specified point is changed.
Figure 4C:
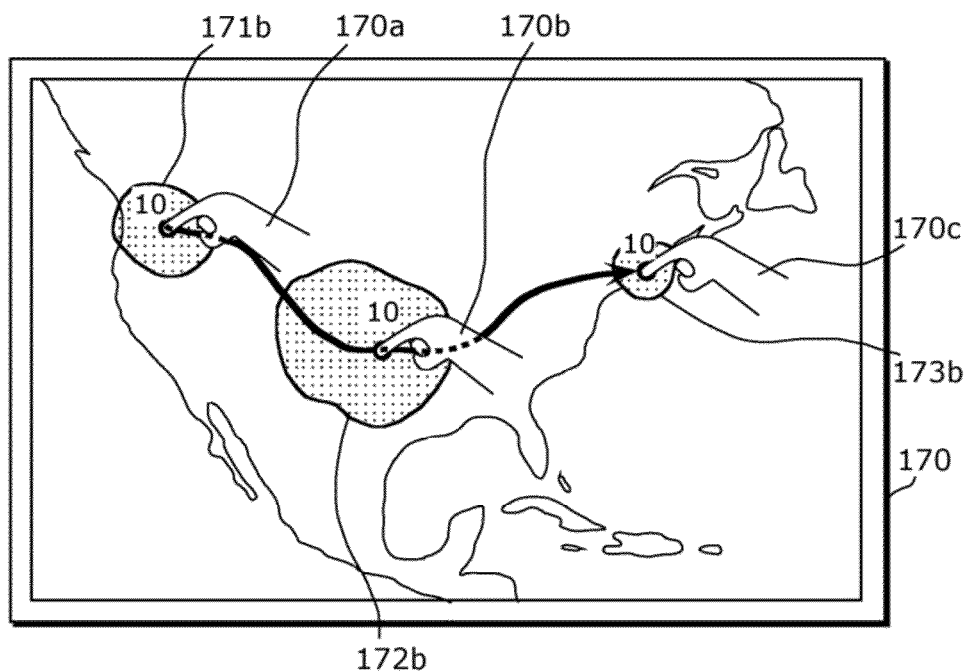
FIG. 4C illustrates an example of a dynamic area that a dynamic area search device according to the first embodiment displays on a display when a user-specified point is changed.

FIGS. 4A to 4C illustrate examples of dynamic areas that the dynamic area search device according to the present embodiment displays on the display 170 when the user-specified point is changed.

As shown in FIG. 4A, for example, when the user changes the user-specified point from a user-specified point 170a to a user-specified point 170b to a user-specified point 170c, areas 171, 172, and 173 appear. The areas 171, 172, and 173 have the user-specified points 170a, 170b, and 170c at the center, respectively and each includes elements, the number of which is identical to the number of search objects (here, 10).

It should be noted that each of the areas 171, 172, and 173 may be displayed only when the user specifies the user-specified points 170a, 170b, and 170c.

In this case, the detection unit 102 of the dynamic area search device 100 detects a second user-specified point on the map displayed on the display 170 that is a point different from a first user-specified point and is a point specified by the user. The display area determination unit 107 determines the second area having the second user-specified point at the center and including, among elements searched for by the content search unit 106, elements that meet conditions for the search scope. The area boundary display unit 108 dynamically displays, on the map, the second user-specified point and the second area determined by the display area determination unit 107.

Moreover, as shown in FIG. 4A, within a certain period of time, a user-specified point prior to a change by the user and the corresponding area may be displayed together with a changed user-specified point and the corresponding area.

In this case, the detection unit 102 of the dynamic area search device 100 further detects a second user-specified point on the map displayed on the display 170 that is a different point from a first user-specified point and is a point specified by the user. The display area determination unit 107 further determines the second area having the second user-specified point at the center and including, among elements searched for by the content search unit 106, elements that meet conditions for the search scope. The area boundary display unit 108 not only dynamically displays, on the map, the first user-specified point and the first area determined by the display area determination unit 107, but also dynamically displays, on the map, the second user-specified point and the second area determined by the display area determination unit 107.

Here, when dynamically displaying, on the map, the first user-specified point and the first area determined by the display area determination unit 107, the area boundary display unit 108 displays conditions for a search scope on the first area. Moreover, when dynamically displaying, on the map, the second user-specified point and the second area determined by the display area determination unit 107, the area boundary display unit 108 displays conditions for a search scope on the second area.

It should be noted that the display area determination unit 107 may determine, as display area, an area of indefinite shape that has the user-specified point (170a, 170b or 170c) at the center and is drawn with the features on the map (such as a distance and a walking time). In this case, as shown in FIG. 4B or 4C, the area boundary display unit 108 successively or simultaneously and dynamically displays, on the map on the display 170, the user-specified points (170a, 170b, and 170c) and the areas of indefinite shape (the areas 171a, 172a, and 173a or 171b, 172b, and 173b) determined by the display area determination unit 107.

FIG. 4B shows the case when the areas of indefinite shape 171a, 172a, and 173a are determined by taking into account a change in altitude from the user-specified points 170a, 170b, and 170c. FIG. 4C shows the case when the areas of indefinite shape 171b, 172b, and 173b are determined by taking into account a traveling time (such as a walking time) from the user-specified points 170a, 170b, and 170c. Details are omitted here as described in the explanation of FIG. 2B.

According to the present embodiment, it is possible to achieve an area search device for intuitively and dynamically displaying an area boundary that meets conditions, in conjunction with user's operations.

It should be noted that the present embodiment is not only achieved as an area search device, but also may be achieved as an integrated circuit having processing means included by such a dynamic area search device, or as a method including steps that are performed by the processing means constituting this area search device.

Figure 5:
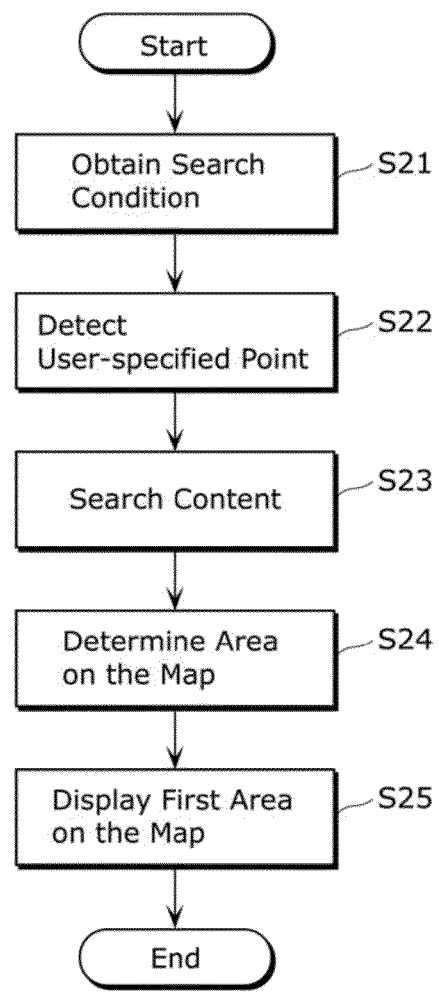
FIG. 5 is a flowchart showing processing performed by a processing means constituting a dynamic area search device according to the first embodiment.

Here, the following steps are included in a method that includes steps performed by the processing means constituting the area search device according to the present embodiment. In other words, the method includes steps of: (i) obtaining information on search objects and a condition for a search scope to search for the search objects, the information and the condition being inputted by a user; (ii) detecting a first user-specified point on a map displayed on a display that is a point specified by a user; (iii) searching elements associated with locations on the map, based on information on the search objects; (iv) determining a first area that has the user-specified point at the center and includes, among the elements searched for in step (iv), elements that meet a condition for the search scope; and (v) dynamically displaying, on the map, the user-specified point and the first area determined by the determination unit. These processing means perform the processing of S21 to S25 shown in FIG. 5. Here, FIG. 5 is a flowchart showing the processing performed by the processing means constituting the area search device according to the present embodiment.

Moreover, in the present embodiment, each structural element may be achieved by making each structural element with a special hardware, or executing a software program suitable for each structural element. A program execution unit such as CPU or a processor reads out and executes a software program recorded on a recording medium such as a hard disk or a semiconductor memory, so that each structural element may be achieved.

Here, software that achieves, for example, the dynamic area search device according to the present embodiment is the following program. In other words, the program causes a computer to execute steps of: (i) obtaining information on search objects and a condition for a search scope to search for the search objects, the information and the condition being inputted by a user; (ii) detecting a first user-specified point on a map displayed on a display that is a point specified by a user; (iii) searching elements associated with locations on the map, based on information on the search objects; (iv) determining a first area that has the user-specified point at the center and includes, among the elements searched for in step (iii), elements that meet a condition for the search scope; and (v) dynamically displaying, on the map, the user-specified point and the first area determined by the determination unit.

[Modification 1]

It should be noted that conditions for the search scope are not limited to the number of search objects described above, but may be, for example, the total capacity of the search objects (e.g., 10 MB). In this case, the display area determination unit 107 may determine a first area having a user-specified point at the center and including, among elements searched for by the content search unit 106, elements, the total capacity of which is the total capacity of the search objects.

[Modification 2]

Moreover, the condition for the search scope may be the total number of the search objects (e.g., 40). In this case, the display area determination unit 107 may determine a first area having the user-specified point at the center and including elements of the total number of the search objects among elements searched for by the content search unit 106, and mufti-layer areas each of which including a fixed number of elements (e.g., 10) which is within the total number of the search objects (40). The area boundary display unit 110 dynamically displays, on the map, the user-specified point and the mufti-layer areas determined by the display area determination unit 107. The mufti-layer areas are, for example, displayed in gradation.

Figure 6:
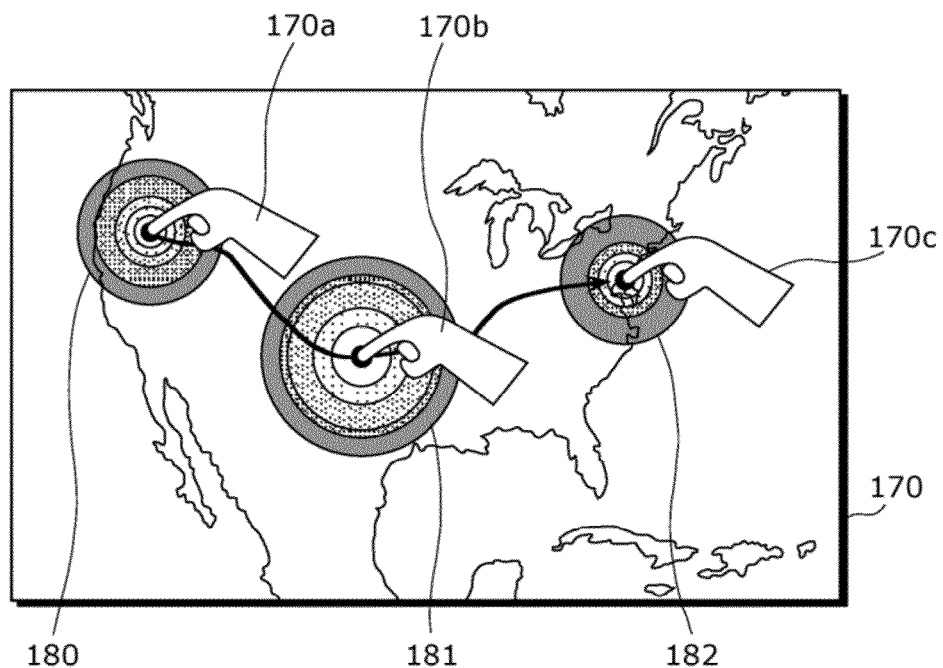
FIG. 6 illustrates an example of a dynamic area to be displayed in gradation on a display when a user-specified point is changed.

It should be noted that when a user-specified point is changed, the mufti-layer areas may be displayed in gradation on the map on the display 170. FIG. 6 illustrates an example of a dynamic area to be displayed in gradation on the map on the display 170 when the user-specified point is changed.

FIG. 6 shows an example that when a location (point) of user's interest is changed from the user-specified point 170*a* to the user-specified point 170*b* to the user-specified point 170*c*, areas 180, 181, and 182 having, at the center, the user-specified points 170*a*, 170*b*, and 170*c*, respectively are displayed in gradation.

Figure 7:
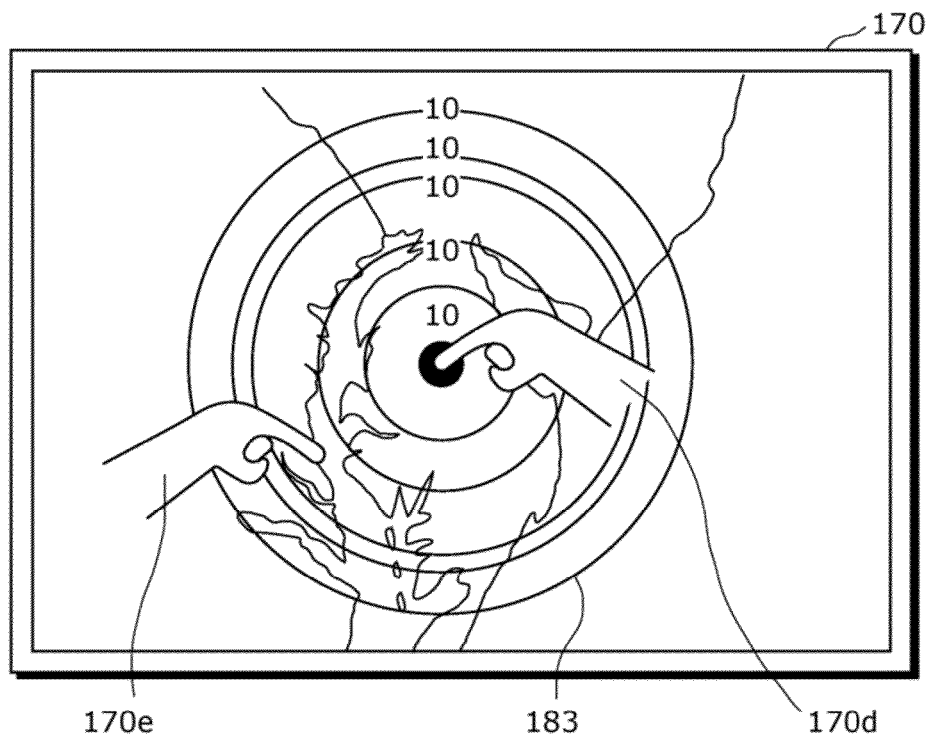
FIG. 7 illustrates a case when a dynamic area displayed in gradation on a display are expanded or reduced.

Moreover, when a dynamic area displayed on the map on the display 170 expands or reduces, the dynamic area may be displayed in gradation. FIG. 7 illustrates a case when a dynamic area displayed in gradation expands or reduces.

As shown in FIG. 7, when the user performs an operation to expand a dynamic area 183 while touching a user-specified point 170*d*, the dynamic area search device 100 may display layer areas in gradation in which each layer area has the user-specified point 170*d* at the center and includes a fixed number of elements (here, 10).

[Modification 3]

It should be noted that adjustment of the sizes of dynamic areas before displaying may be desired.

Figure 8A:
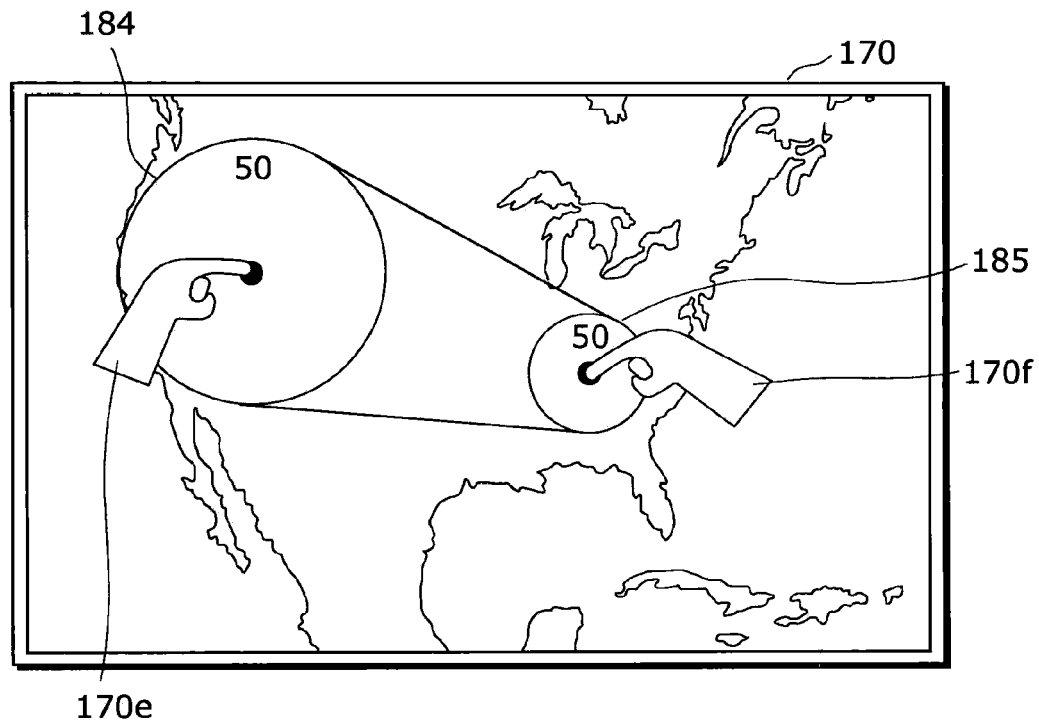
FIG. 8A illustrates a case when the sizes of dynamic areas are adjusted and displayed.
Figure 8B:
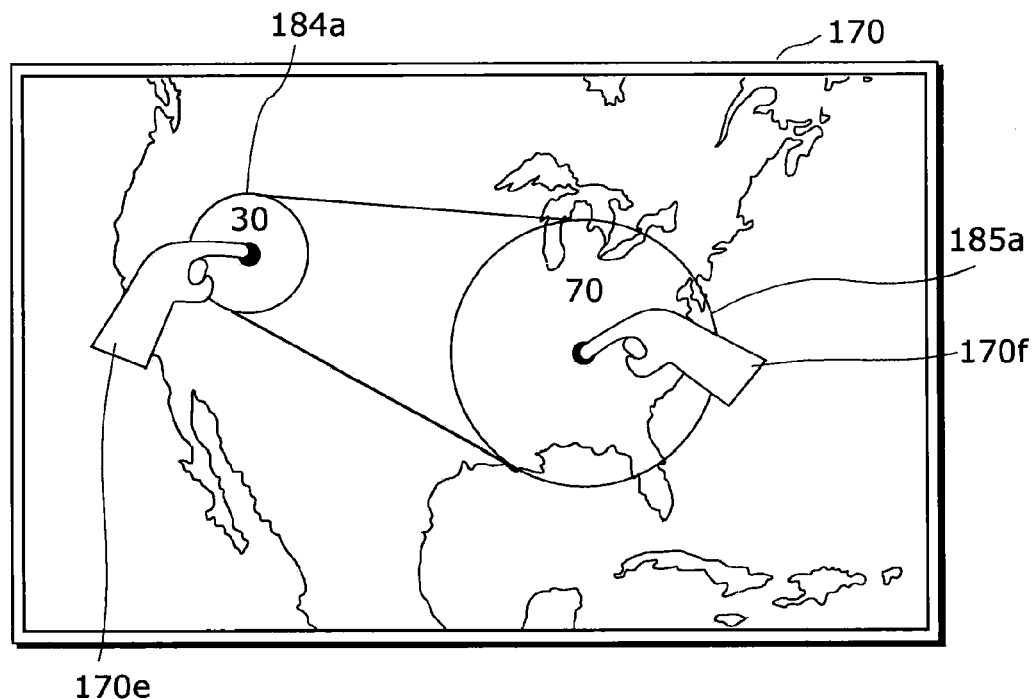
FIG. 8B illustrates a case when the sizes of dynamic areas are adjusted and displayed.

FIGS. 8A and 8B illustrate cases when the sizes of dynamic areas are adjusted and displayed.

A user touches the map on the display 170 using, for example, a forefinger of the right hand or left hand to specify two user-specified points 170*e* and 170*f*. The dynamic area search device 100 determines the predetermined number of elements (e.g., 50) closest to the user-specified points 170*e* and 170*f*, and displays, as shown in FIG. 8A, areas 184 and 185 each including elements of the predetermined number on the map. The two areas 184 and 185 shown in FIG. 8A are different in size.

It should be noted that although the case when the user simultaneously specifies two user-specified points is described above, other cases are also possible. The user may simultaneously specify three or more user-specified points, and if this is the case, the dynamic area search device 100 may display areas depending on the number of the user-specified points.

Moreover, when two or more user-specified points and dynamic areas thereof are displayed, the user may change more than one dynamic area for comparison. For example, as shown in FIG. 8B, when the total number of the elements included in the two areas is fixed (e.g., 100), and the size of the area 184 is changed, the size of the other area 185 is also changed in response to the change. Here, when the area 184 is reduced to include 30 elements (the area 184*a* in FIG. 8B), the area 185 is expanded to include 70 elements (the area 185*a* in FIG. 8B). Thus, the total number of elements to be displayed can be maintained at 100.

Embodiment 2

Figure 9:
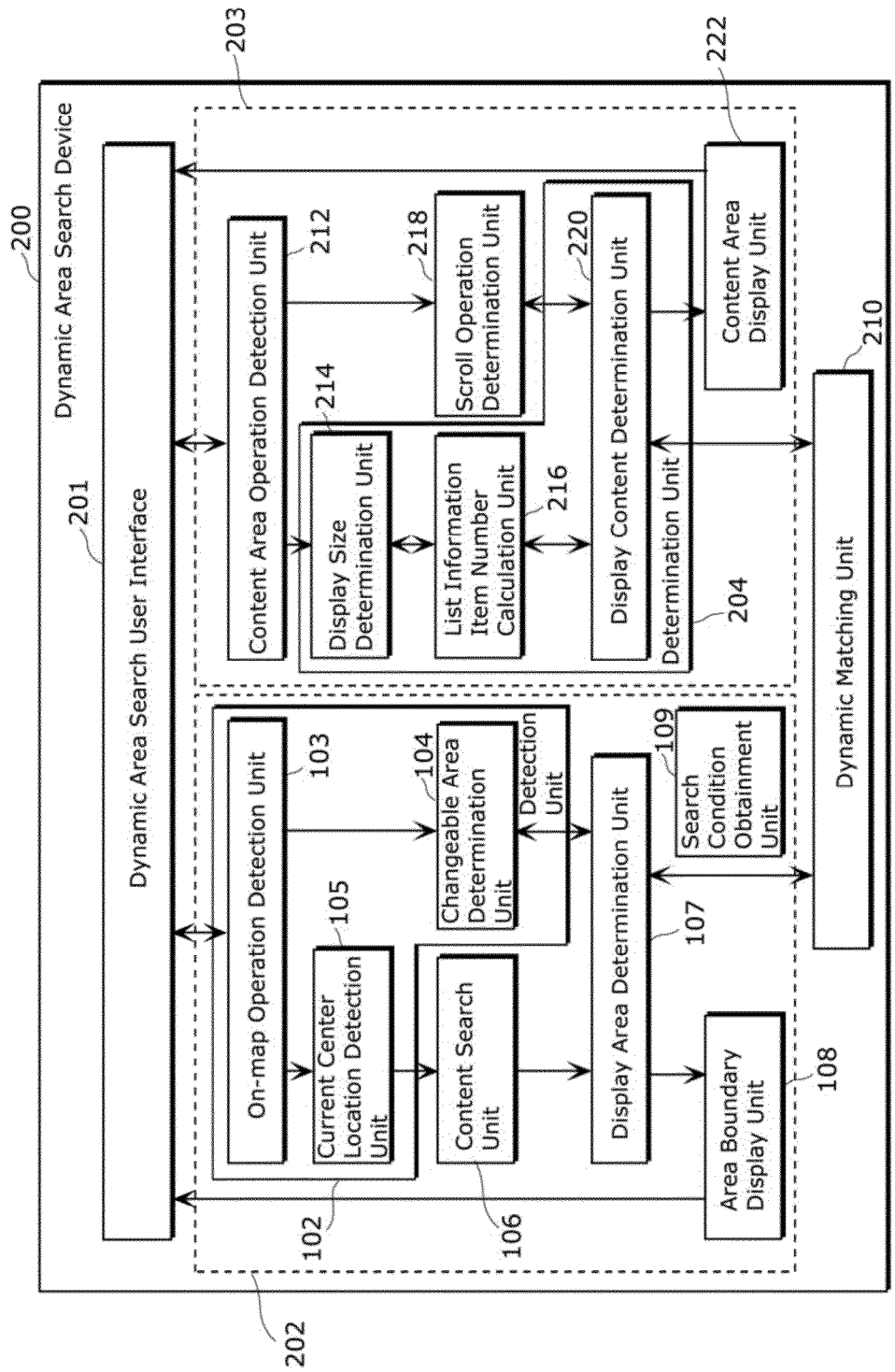
FIG. 9 is a block diagram illustrating an example of the configuration of a dynamic area search device according to the second embodiment.

FIG. 9 is a block diagram illustrating a configuration example of a dynamic area search device according to the second embodiment of the present invention. It should be noted that the same reference numerals are given to the same elements as those shown in FIG. 1 and detailed description will be omitted here.

A dynamic area search device 200 shown in FIG. 9 includes a dynamic area search user interface 201, an on-map operation processing unit 202, a content area operation processing unit 203, and a dynamic matching unit 210.

The on-map operation processing unit 202 includes a detection unit 102, a content search unit 106, a display area determination unit 107, an area boundary display unit 108, and a search condition obtainment unit 109. The detection unit 102 includes an on-map operation detection unit 103, a changeable area determination unit 104, and a current center location detection unit 105. On the other hand, the content area operation processing unit 203 includes a determination unit 204, a content area operation detection unit 212, a scroll operation determination unit 218, and a content area display unit 222. Here, the determination unit 204 includes a display size determination unit 214, a list information item number calculation unit 216, a display content determination unit 220.

The content area operation detection unit 212 detects user's operation on a content area.

The scroll operation determination unit 218 determines whether or not the user's operation detected by the content area operation detection unit 212 is a scroll operation which allows the user to scroll list information items displayed on the content area. Specifically, the scroll operation determination unit 218 determines when the user scrolls the list information items displayed in the content area.

The display content determination unit 220 determines the number of the list information to appear in the content area items and the display size of each of the list information items.

Specifically, the display content determination unit 220 determines the number of the list information items to be displayed in the content area and the display size of each of the list information items, based on the number of elements included in a first area displayed by the area boundary display unit 108. The display content determination unit 220 also determines the number and display size of the list information items to be displayed in the content area, based on user's operation detected by the content area operation detection unit 212.

The display content determination unit 220 also determines the number of the list information items to be displayed in the content area and the display size of each of the list information items, based on a scroll operation detected by the content area operation detection unit 212.

The content area display unit 222 displays, in the content area of a display, list information items indicating elements included in the first area displayed by the area boundary display unit 108.

Specifically, the content area display unit 222 displays, in the content area on the display, list information items, the number and display size of which are determined by the display content determination unit 220. Moreover, the list information items, the number and display size of which are determined by the display content determination unit 220 are scrolled by a scroll operation and the content area display unit 222 displays, in the content area on the display, the scrolled list information items.

The dynamic matching unit 210 changes the number and display size of list information items determined by the display content determination unit 220 and the number of elements included in a first area determined by the display area determination unit 107 in conjunction with each other. This allows the dynamic matching unit 210 to match the number of the list information items in the content area displayed by the content area display unit 222 and the number of elements included in the area displayed by the area boundary display unit 108.

Specifically, due to the operation of the dynamic matching unit 210, the search condition obtainment unit 109 updates conditions for a search scope for searching for search objects so as to include only the elements that correspond to the list information items displayed by the content area display unit 222. The display area determination unit 107 determines a second area having a user-specified point at the center and including, among elements searched for by the content search unit 106, elements that meet conditions for the search scope updated by the search condition obtainment unit 109. The area boundary display unit 108 dynamically displays, on the map, the user-specified point and the second area determined by the display area determination unit 107.

It should be noted that a display is a touch screen display, and the detection unit 102 and the content area operation detection unit 212 detect user's operation on the display by detecting an operation on the touch screen display.

The configuration of the dynamic area search device 200 is described above.

Figure 10:
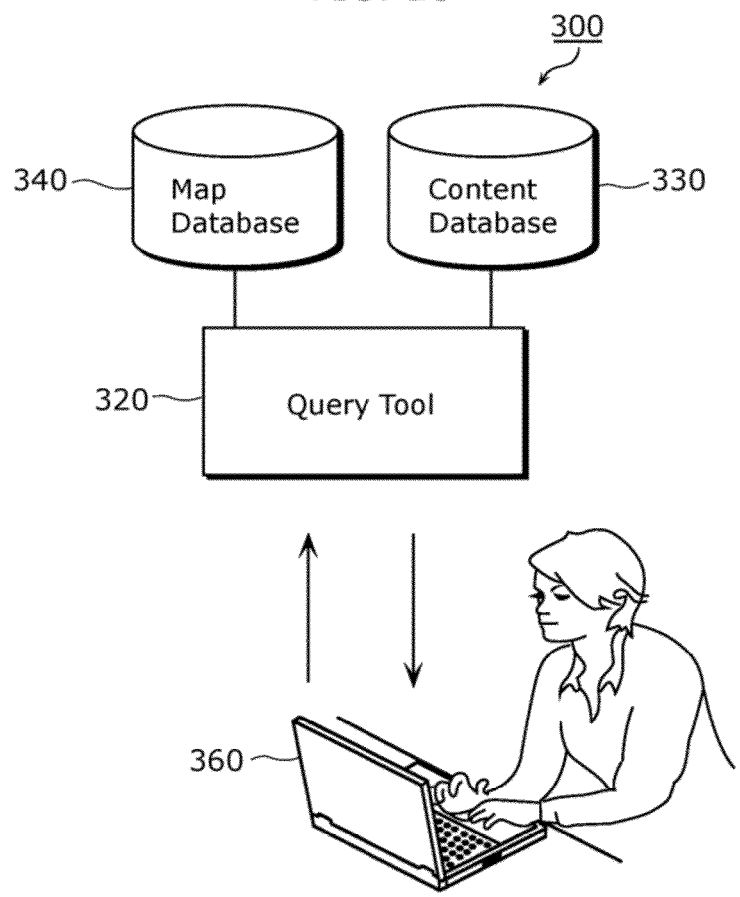
FIG. 10 is an example of a system into which a dynamic area search device according to the second embodiment is incorporated.

FIG. 10 is an example of a system into which a dynamic area search device according to the present embodiment is incorporated. In FIG. 10, the dynamic area search device 200 is, for example, incorporated into a computer 360 having a display.

FIG. 10 illustrates a configuration example of a system 300 in which a dynamic area appears on a map. The system 300 includes a query tool 320, a content database 330, and a map database 340. Here, the content database 330 contains list information items corresponding to elements, and the map database 340 contains map information on the elements. A case when content (elements) in the dynamic area search device 200 is searched for with a search query will be described below as an example.

The query tool 320 is a computer software program (i.e., computer executable instruction) that is executed by a processor of the computer 360.

The computer 360 may have conventional computer architecture including a central processing unit (CPU), a random access memory, and other type of a data storage connected to a data bus. Moreover, the computer 360 includes an I/O unit and one or more user interface components among a display, a key board, a touch panel, and the like in order to facilitate cooperation with an external device via an appropriate means such as wired or wireless connectivity.

It should be noted that the computer 360 is not limited to the above example, but may include other types of components and/or architecture.

The dynamic area search device 200 incorporated into the computer 360 executes a query on the content database 330, using the query tool 320.

For example, when searching for retailers in a particular area of interest on a map, in order to create criteria for a search query, a user may specify a point of geographical interest on the map as a user-specified point. It should be noted that the user may input the name of a city and/or a zip code indicating a point of geographical interest, instead of specifying a user-specified point. Moreover, the computer 360 may have the global positioning system (GPS), or may use a current global coordinate notified by the GPS for creating the criteria for the search query. In other words, a method of indicating a point of geographical interest is not limited to the above examples, but other types of characteristics may be used. Moreover, when creating the search query, the user may combine a characteristic indicating an area of geographical interest and search criteria. In any case, the query tool 320 may obtain a characteristic indicating a point of geographical interest, and use the characteristic for the search query.

The query tool 320 queries the content database 330, using the obtained criteria.

Here, the content database 330 includes elements (list information items) to be searched for, such as a list of retailers as search objects for which the user wishes to search.

Figure 11A:
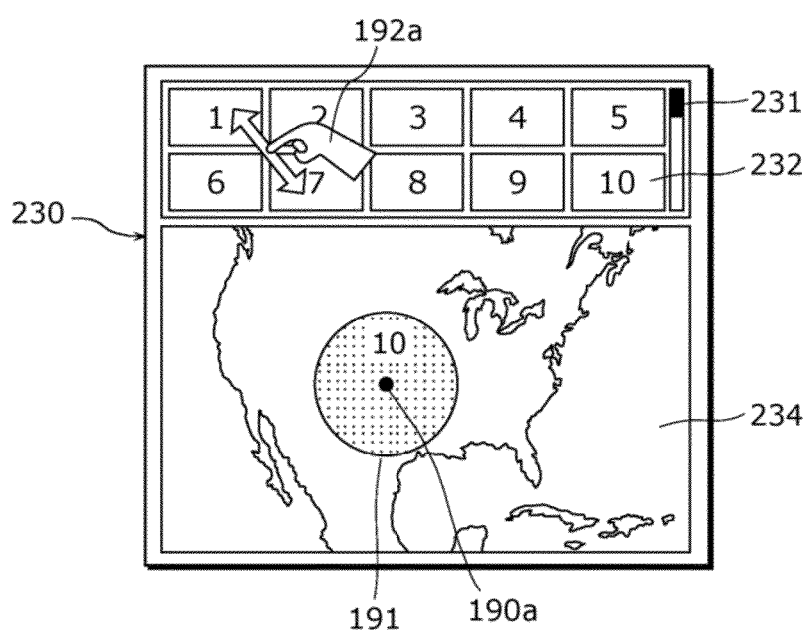
FIG. 11A illustrates an example of a dynamic area that a dynamic area search device according to the second embodiment displays on a display.

A search result obtained by the query tool 320, for example as shown in FIG. 11A, is displayed in association with the map.

The following describes, with reference to FIGS. 11A to 19B, examples of a dynamic area displayed in a map area 234 on a display 230 (display screen) and list information items displayed in a content area 232. It should be noted that the following description is based on assumption that the display 230 is a touch panel display, and the dynamic area search device 200 detects user's operation by detecting user's touch gesture via the display 230. Moreover, a point of geographical interest described below corresponds to a user-specified point according to the present embodiment. The following description is based on assumption that the user-specified point can be specified without touch gestures on the display.

Figure 11B:
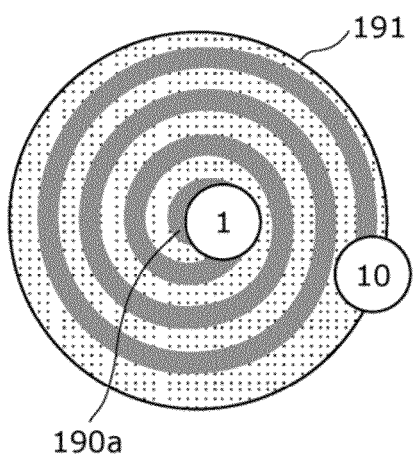
FIG. 11B illustrates an example of a method by which a dynamic area search device according to the second embodiment counts the number of search objects, using a user-specified point as a base point.

FIG. 11A illustrates an example of a dynamic area that the dynamic area search device 200 according to the present embodiment displays on the display 230. FIG. 11B illustrates an example of a method of counting the number of search objects with the user-specified point as a base point.

As shown in FIG. 11A, the display 230 is divided into different areas including the content area 232 and the map area 234. The content area 232 displays list information items of elements that meet conditions for a search area 191 having the user-specified point 190a among elements searched for by the on-map operation processing unit 202. Here, the list information is a list of elements (search objects) or a subset thereof. For example, when the search objects are retailers, contact addresses such as the names, addresses, and telephone numbers of the retailers may appear in the content area 232 as a list of elements. The map area 234 displays an area 191 (having a user-specified point 190a at the center) that covers an area of geographical interest. It should be noted that the content area 232 shown in FIG. 11A also displays a scroll 231.

Here, the dynamic area search device 200 displays, in the content area 232, list information items, the number of which is the number of search objects that is the condition for a search scope, i.e., the predetermined number of elements (e.g., 10). As described above, a user can freely change the number of the search objects.

Therefore, in FIG. 11A, the content area 232 displays list information (an index) of 10 elements, and the map area 234 displays an area 191 including 10 elements. In other words, at a specific time, the number of retailers (the number of list information items) displayed in the content area 232 is, as shown in FIG. 11A, identical to the number of elements included in the area 191 displayed in the map area 234.

Thus, the dynamic area search device 200 can make a user more intuitively understand the correlation between the content area 232 and the map area 234.

It should be noted that the area 191 shown in FIG. 11A includes elements close to a point of geographical interest. For example, the elements included in the area 191 are narrowed down using conditions for a search scope. For example, the dynamic area search device 200 determines (i) the order of elements in the map area 234, based on the geographical proximity from the user-specified point that is a particular point of interest (e.g. the closest point from the furthest point), and (ii) elements that meet conditions for the search scope by narrowing down to elements closer to the user-specified point (a point of interest), based on the conditions for search scope. In other words, the dynamic area search device 200 determines 10 elements in order of distance from the particular point of interest (user-specified point). The list information items (e.g., index) correspond to elements determined by the dynamic area search device 200 appear in the content area 232.

It should be noted that a way of selecting elements is not limited to the above example. For example, as shown in FIG. 11B, elements are determined that meet conditions for a search scope such as the number of search objects (here, 10) by clockwise counting the geographical proximities of elements from the user-specified point 190a. The dynamic area search device 200 determines the area 191 including the determined elements to display the area 191 in the map area 234.

Moreover, as an example of using a search query, the query tool 320 queries the map database 340 to obtain the area 191 including a particular point of interest (the user-specified point 190a). The map area 234 displays the obtained area 191. Thus, elements included in the area 191 are displayed inside the area 191.

It should be noted that the display area determination unit 107 determines a circle area having the user-specified point 190a at the center as the area 191. In other words, the display area determination unit 107 determines, as the area 191 that is the determined circle, a circle area having, at the center, the user-specified point 190a that is a point of user's geographical interest on the map, and including, on the circumference, an element in the furthest location from the user-specified point 190a among searched elements.

Figure 12:
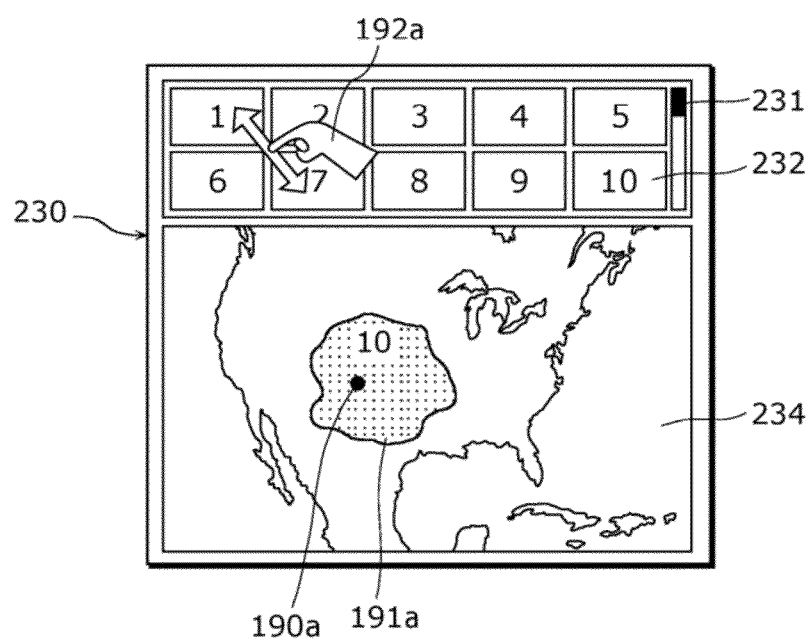
FIG. 12 illustrates another example of a dynamic area that a dynamic area search device according to the second embodiment displays on a display.

FIG. 12 illustrates another example of a dynamic area that the dynamic area search device 200 according to the present embodiment displays on the display 230.

In other words, the display area determination unit 107 determines a display area as an area 191a of indefinite shape that has the user-specified point 190a at the center and is drawn with characteristics on the map (such as a distance and a walking time). In this case, as shown in FIG. 12, the area boundary display unit 108 dynamically displays, in the map area 234, the user-specified point 190a and the area 191a of indefinite shape determined by the display area determination unit 107. It should be noted that as being detailed in the explanation of FIG. 2B, the way of determining an area of indefinite shape will not be described here.

Figure 13:
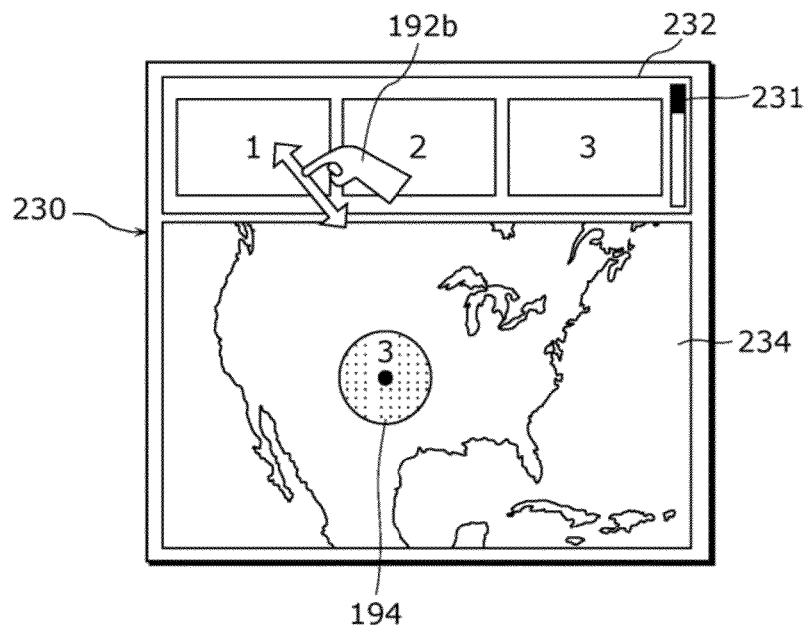
FIG. 13 shows an example that when the number of list information items displayed in the content area according to the second embodiment is adjusted, a dynamic area displayed in the map area is expanded or reduced in conjunction with the adjustment.
Figure 14:
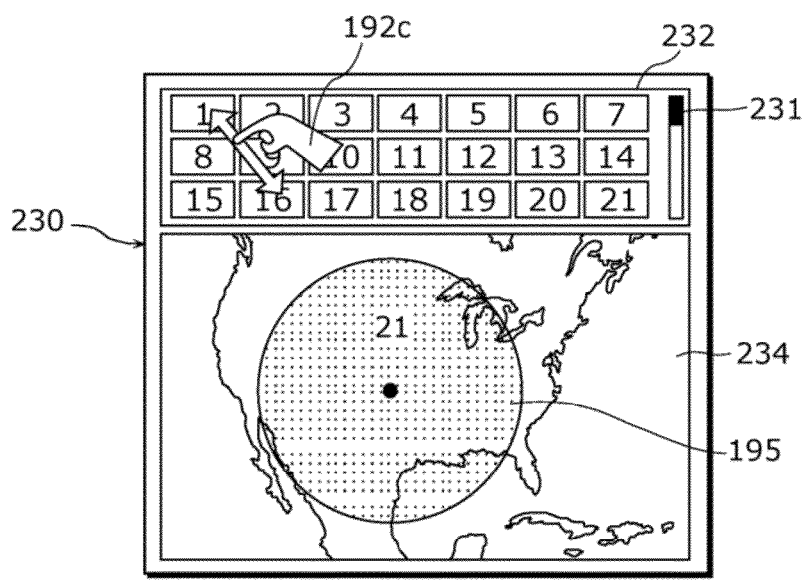
FIG. 14 shows an example that when the number of list information items displayed in the content area according to the second embodiment is adjusted, a dynamic area displayed in the map area is expanded or reduced in conjunction with the adjustment.

FIGS. 13 and 14 show examples that when the number of list information items displayed in the content area is adjusted, the dynamic area displayed in the map area expands or reduces in conjunction with the adjustment.

A user may wish to adjust the number of list information items displayed in the content area 232. In this case, as shown in FIG. 13, following user's operation to increase the number of list information to be displayed on the content area 232 (here, 3) (a touch gesture operation 192b), the number of list information to be displayed in the content area 232 increases (here, 21). At this time, the dynamic area search device 200 expands a dynamic area 194 displayed in the map area 234 to a dynamic area 195 in conjunction with the increase in the number of list information items.

Likewise, as shown in FIG. 14, following user's operation to decrease the number of list information items displayed in the content area 232 (here, 21) (touch gesture operation 192c), the number of list information items displayed in the content area 232 decreases as shown in FIG. 13. At this time, the dynamic area search device 200 reduces the dynamic area 195 displayed in the map area 234 to the dynamic area 194 in conjunction with the decrease in the number of list information items.

Figure 15A:
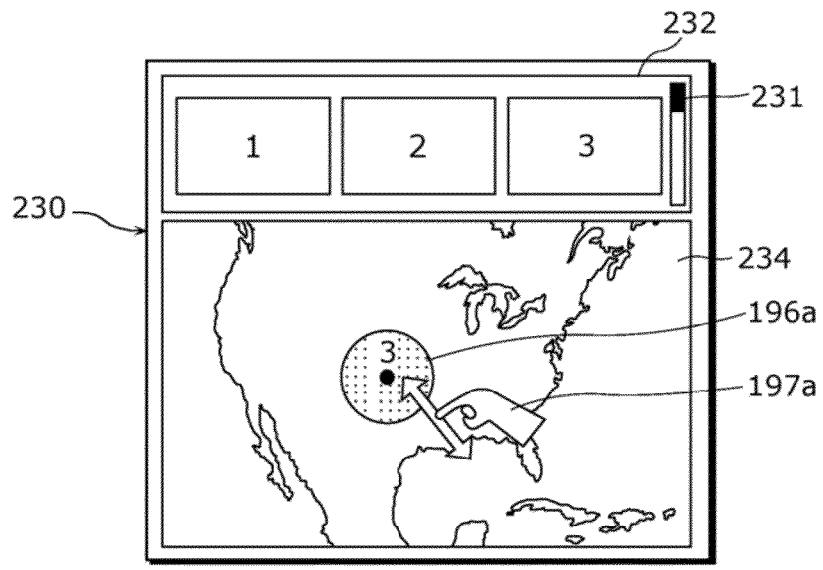
FIG. 15A shows an example that when a dynamic area displayed in the map area according to the second embodiment is adjusted in size, the number of list information items displayed in the content area increases or decreases in conjunction with the adjustment.
Figure 15B:
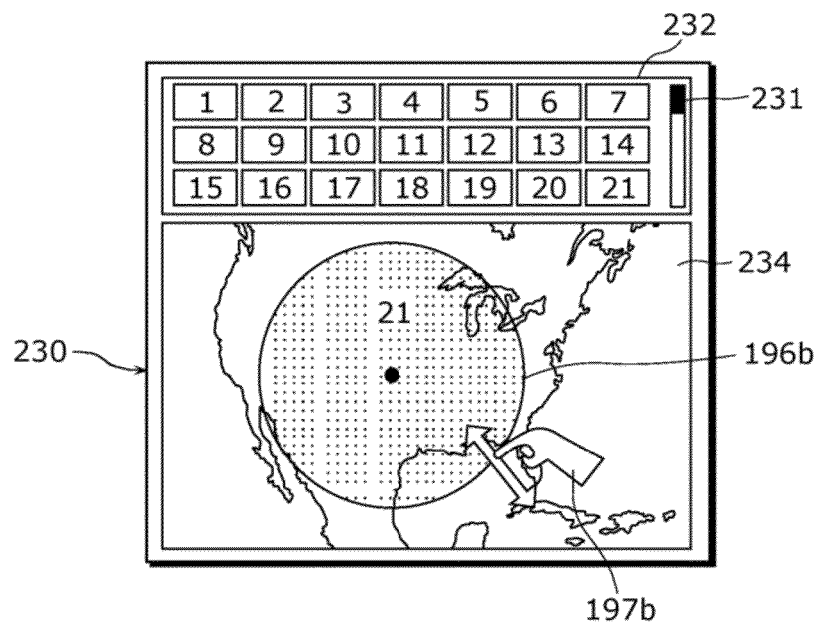
FIG. 15B shows an example that when a dynamic area displayed in the map area according to the second embodiment is adjusted in size, the number of list information items displayed in the content area increases or decreases in conjunction with the adjustment.

FIGS. 15A and 15B show examples that when the dynamic area displayed in the map area according to the present embodiment is adjusted in size, the number of list information items displayed in the content area increases or decreases in conjunction with the adjustment in size.

A user may wish to reduce or expand the dynamic area displayed in the map area 234. For example, as shown in FIG. 15A, the user performs an operation to expand a dynamic area 196a displayed in the map area 234 (a touch gesture operation 197a). As shown in FIG. 15B, the expanded dynamic area 196b appears in the map area 234. At this time, the dynamic area search device 200 increases the number of information list items displayed in the content area 232 (here, increases from 3 to 21) in conjunction with the increase in size of the dynamic area.

Likewise, as shown in FIG. 15B, a user performs an operation to reduce the dynamic area 196b displayed in the map area 234 (a touch gesture operation 197b). As shown in FIG.

15A, the reduced dynamic area 196*a* appears in the map area 234. At this time, the dynamic area search device 200 decreases the number of list information items displayed in the content area 232 (here, decreases from 21 to 3) in conjunction with the decrease in size of the dynamic area.

Figure 16A:
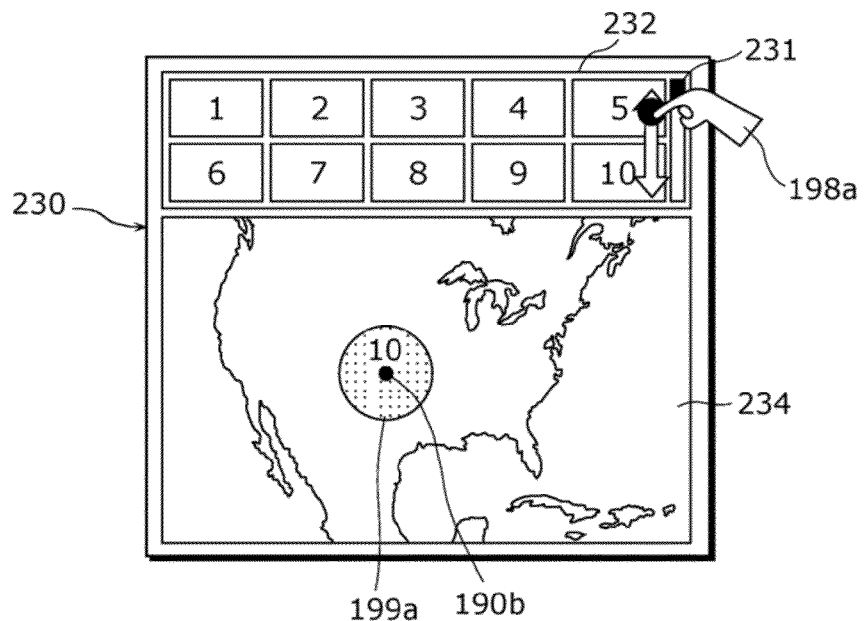
FIG. 16A shows an example that when list information displayed in the content area according to the second embodiment is updated, a dynamic area displayed in the map area is also updated in conjunction with the update of the list information.
Figure 16B:
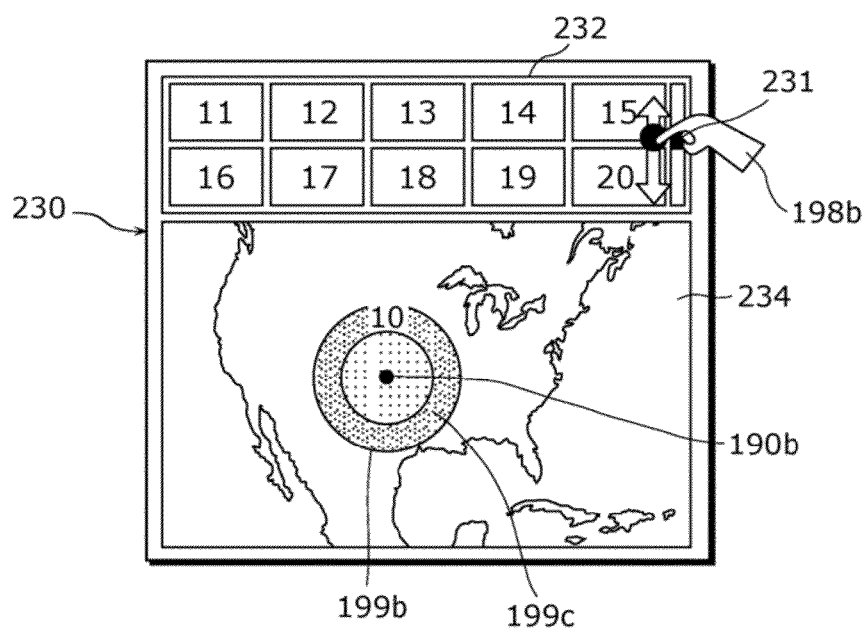
FIG. 16B shows an example that when list information displayed in the content area according to the second embodiment is updated, a dynamic area displayed in the map area is also updated in conjunction with the update of the list information.
Figure 16C:
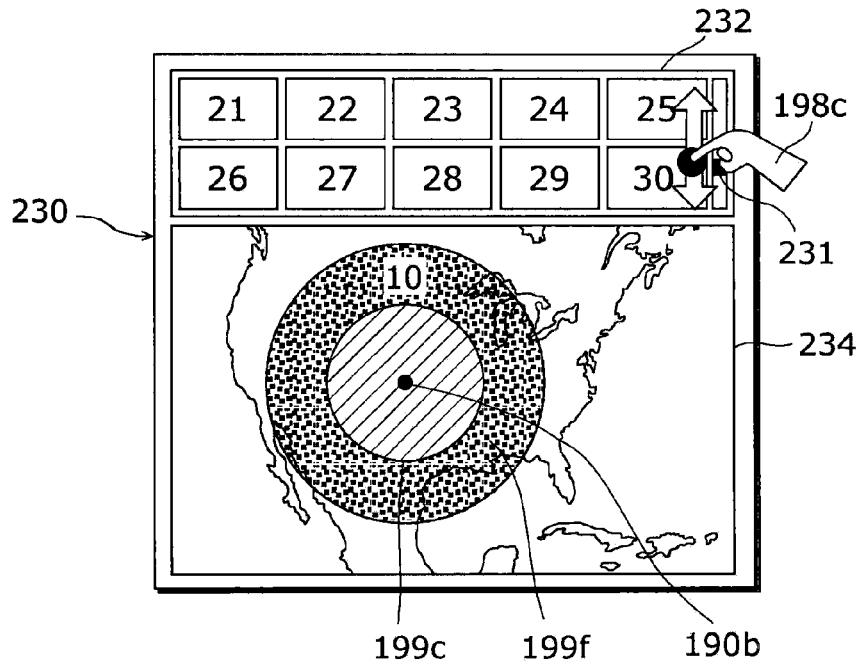
FIG. 16C shows an example that when list information displayed in the content area according to the second embodiment is updated, a dynamic area displayed in the map area is also updated in conjunction with the update of the list information.

FIGS. 16A to 16C show examples that when list information items displayed in the content area according to the present embodiment are updated, the dynamic area displayed in the map area is also updated in conjunction with the update of the list information items.

A user may wish to update list information items displayed in the content area 232. For example, as shown in FIG. 16A, the user performs an operation to change the list information items displayed in the content area 232 (here, list items 1 to 10) (a scroll operation 198*a*). As shown in FIG. 16B, the list information items displayed in the content area 232 are changed (here, list items 11 to 20). Specifically, the user scrolls downward the list information items displayed in the content area 232 (the scroll operation 198*a*). The dynamic area search device 200 displays, in the content area 232, the next 10 list information items (list items 11 to 20) which are close to a user-specified point 190*b* after the list items 1 to 10. At this time, the dynamic area search device 200 changes a dynamic area 199*a* displayed in the map area 234 to a dynamic area 199*b* that includes mufti-layer areas, in conjunction with the update of the list information items displayed in the content area 232, and highlights a layered area 199*c* that corresponds to the list information items displayed in the content area 232.

Moreover, as shown in FIG. 16B, a user may perform an operation to change list information items (list items 11 to 20) displayed in the content area 232 (a scroll operation 198*b*). In this case, as shown in FIG. 16C, the list information items displayed in the content area 232 are changed (here, list items 21 to 30). Specifically, the user scrolls downward the list information items displayed in the content area 232 (the scroll operation 198*b*). The dynamic area search device 200 displays the next 10 list information items (list items 21 to 30) which are close to a user-specified point 190*b* after the list items 11 to 20. At this time, the dynamic area search device 200 changes the dynamic area 199*b* displayed in the map area 234 to a dynamic area 199*c* that includes mufti-layer areas, in conjunction with the update of the list information items displayed in the content area 232, and highlights a layer area 199*f* that corresponds to the list information items (list items 21 to 30) displayed in the content area 232.

Here, the layer area 199*f* displays the number of elements therein inside or near the layer area 199*f*.

It should be noted that although FIG. 16C shows a case when a dynamic area 199*e* is displayed that includes all the elements corresponding to 30 list information items, other cases are also possible. Only the layer area 199*f* that corresponds to the information items (lists 21 to 30) displayed in the content area 232 may be displayed in the map area 234, and the other layer area may not be displayed.

Moreover, the number of elements included in the layer area that is not the layer area 199*f* is not limited to the above example, but a user may specify the number of elements.

Figure 17:
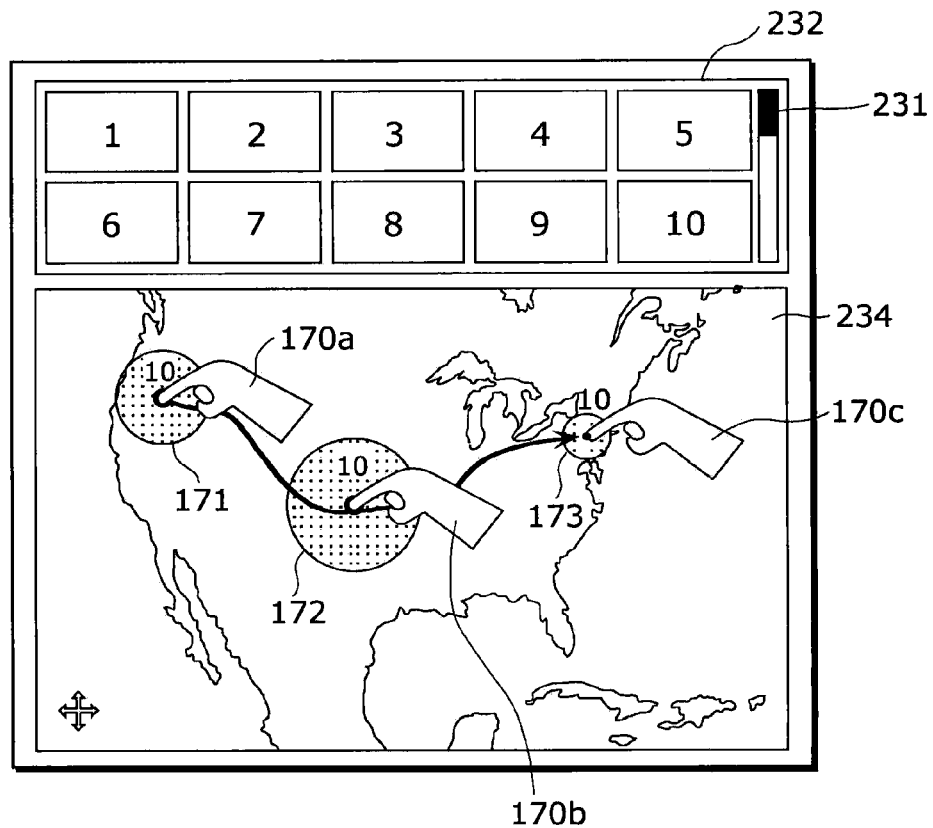
FIG. 17 shows an example of dynamic areas displayed in the map area when a user-specified point is changed.

FIG. 17 shows an example of dynamic areas to be displayed in the map area when the user-specified point is changed.

A user may wish to change the user-specified point in the map area 234.

In this case, for example as shown in FIG. 17, the user can change the user-specified point from the user-specified point 170*a* to the user-specified point 170*b* to the user-specified point 170*c*. The dynamic area search device 200 dynamically adjusts the sizes of the boundaries of areas 171, 172, and 173 and displays the areas 171, 172 and 173 in the map area 234. Here, the areas 171, 172, and 173 have the user-specified points 170*a*, 170*b*, and 170*c* at the center, respectively, and each includes elements, the number of which is identical to the number of search objects (here, 10).

Here, the user may slide a finger on the map area 234 as a way of identifying the user-specified point. In this case, the dynamic area search device 200 dynamically adjusts the sizes of the boundaries of the areas 171, 172, and 173 and displays the areas 171, 172, and 173 including elements, the number of which is identical to the number of search objects (here, 10).

Thus, as the areas 171, 172, and 173 remain in the map area, the user can compare the sizes of the areas 171, 172, and 173.

It should be noted that the way of specifying the user-specified point is not limited to the above example.

Moreover, the user-specified point that is a particular point of interest is not necessarily a user-specified point only for an area boundary. As the explanation for FIG. 6 in the first embodiment, the user-specified points 170*a*, 170*b*, and 170*c* may be the user-specified points in gradation colored layer areas. An example includes a case when the gradation colored layer areas show a first layer area including the first 25 elements (lists 1 to 25), a second layer area including the next 25 elements (lists 26 to 50), and a third layer area including the next 25 elements (lists 51 to 75). Each layer area does not have to have 25 elements, but the number of elements may be appropriately set.

The following describes a case when a user changes a point of geographical interest.

FIGS. 18A to 18C and FIGS. 19A and 19B illustrate examples of dynamic areas to be displayed in the map area when a point of user's interest is changed.

The user can specify a point of geographical interest by touching the map area 234 on the display 230 (touch gesture operation).

Figure 18A:
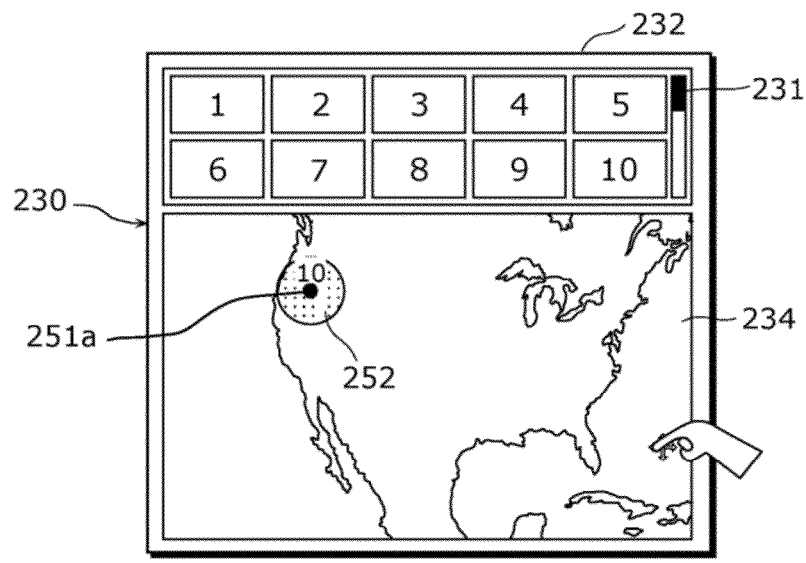
FIG. 18A shows an example of a dynamic area displayed in the map area when a point of user's interest is changed.
Figure 19A:
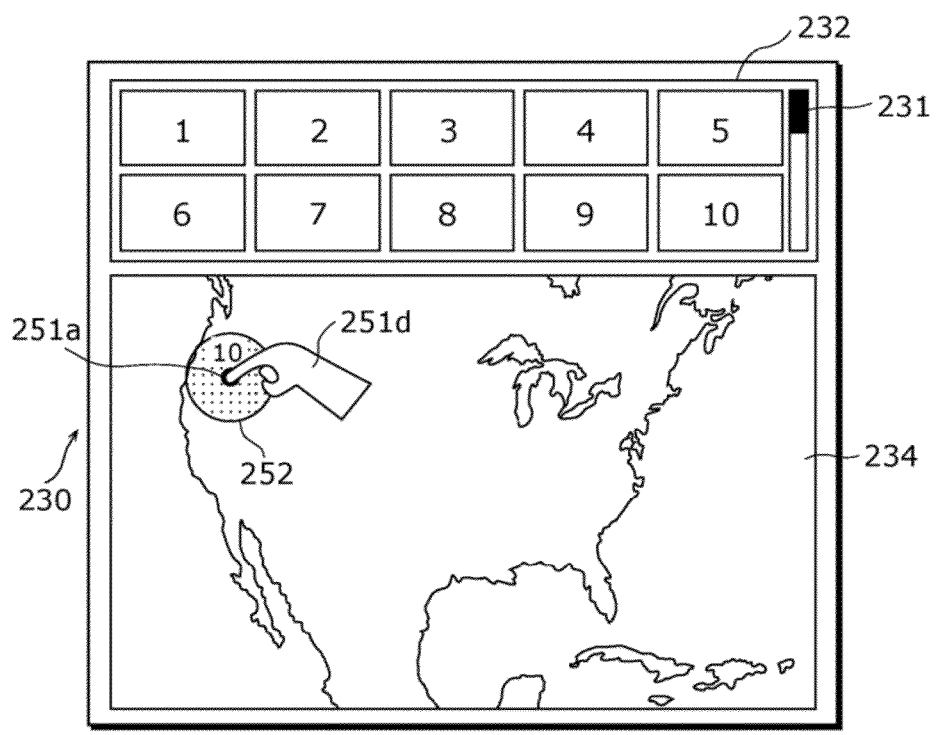
FIG. 19A shows an example of a dynamic area displayed in the map area when a point of user's interest is changed.

FIGS. 18A and 19A illustrate examples that a dynamic area 252 appears by user touching one point that is a point of geographical interest (a user-specified point 251*a*). Moreover, in FIG. 18A, when the dynamic area search device 200 (i) determines a predetermined number (e.g., 10) of elements closest to the user-specified point 251*a*, and (ii) displays the dynamic area 252 in the map area 234 and displays the list information items of these elements in the content area 232.

Figure 18B:
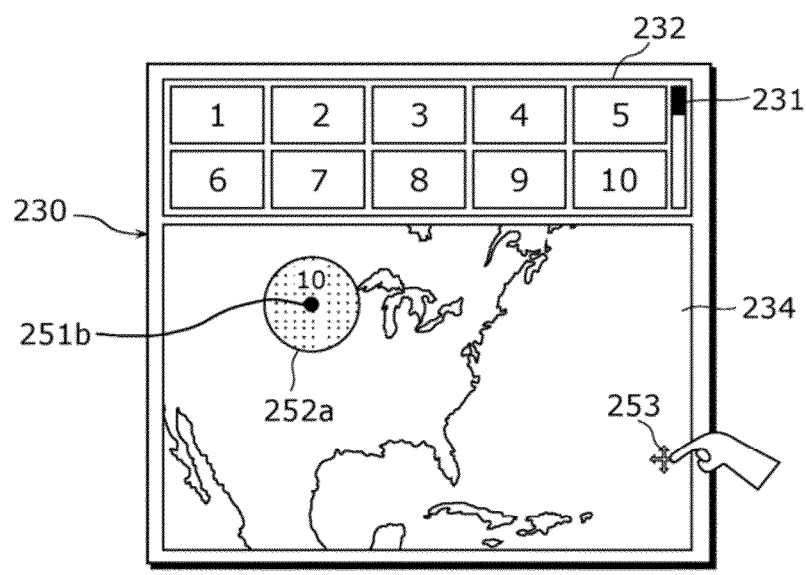
FIG. 18B shows an example of a dynamic area displayed in the map area when a point of user's interest is changed.

Here, as shown in FIG. 18B, the user changes a geographical location displayed in the map area 234, using, for example, an arrow icon 253 displayed in the map area 234 to change a user-specified point 251*b*.

Figure 18C:
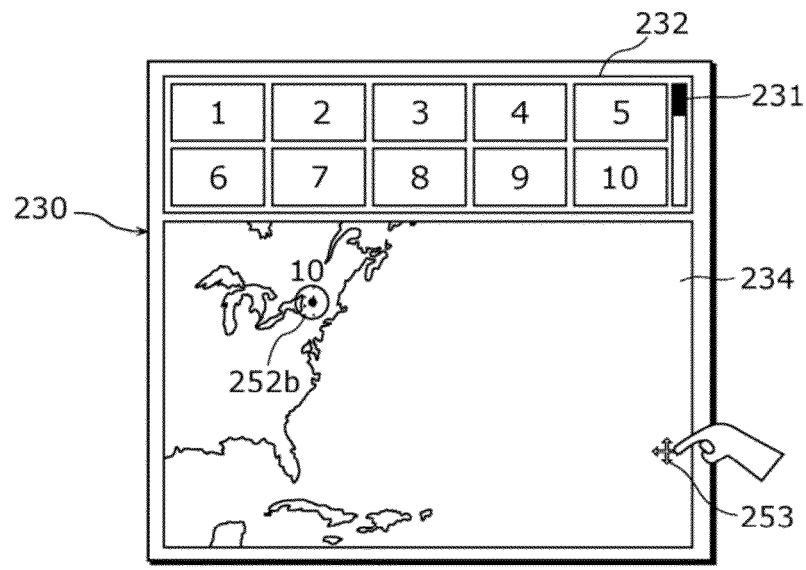
FIG. 18C shows an example of a dynamic area displayed in the map area when a point of user's interest is changed.

Moreover, as shown in FIG. 18C, the user may change a map scale in the map area 234, using the arrow icon 253 displayed in the map area 234, while maintaining the predetermined number of elements included in the dynamic area. In this case, as shown in FIGS. 18A to 18C, the size of a dynamic area 252*b* including the user-specified point is dynamically adjusted according to the map scale before displaying.

Figure 19B:
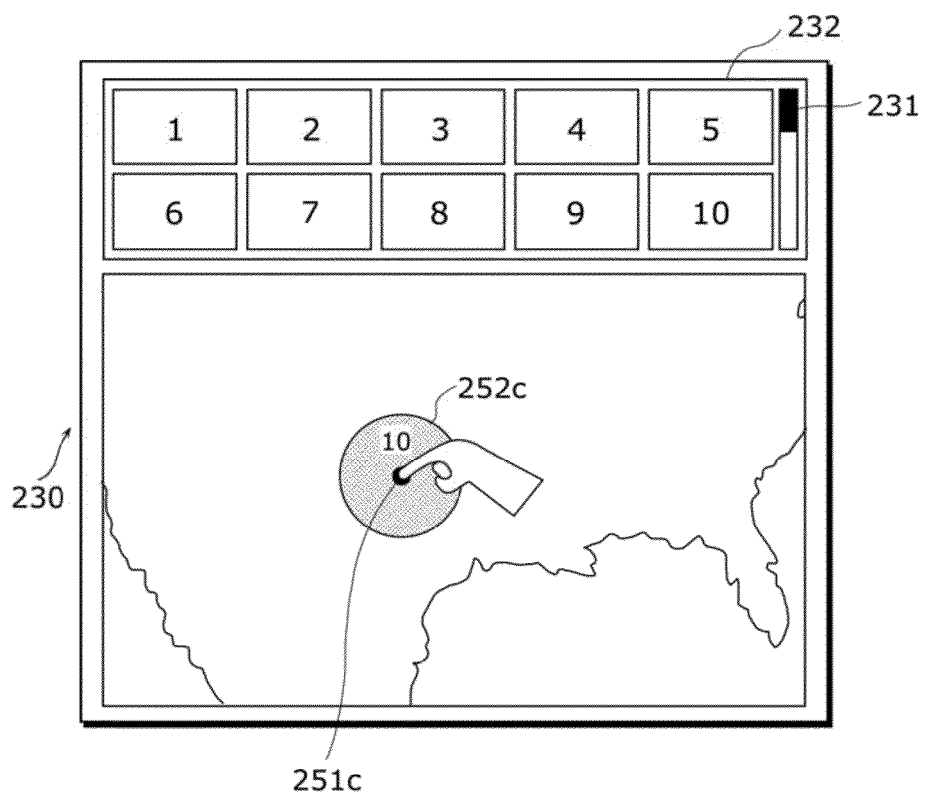
FIG. 19B shows an example of a dynamic area displayed in the map area when a point of user's interest is changed.

It should be noted that ways of the user changing a point of interest (user-specified point) are not limited to the above examples. As shown in FIGS. 19A and 19B, the user may change a user-specified point 251*c* by, for example, performing a touch gesture 251*d* on the map area 234 on the display 230 while touching the dynamic area 252 on the map area 234 to move the geographical location of a dynamic area 252 displayed in the map area 234. Here, in the examples shown in FIGS. 19A and 19B, the sizes of the dynamic areas (the numbers of elements included) are the same between the two points of interest.

It should be noted that when the user-specified point is changed from the user-specified point 251a to the user-specified point 251c, the scale of the map area 234 displayed on the display 230 may be changed so as to display the dynamic area on the map area 234.

It should be noted that when a map is, for example as shown in FIG. 4A, displayed at the predetermined scale and the first area is displayed in an expanded or reduced size, such a scale change of the map area 234 can be used for control that (i) when the size of the first area is a predetermined value or larger, the map is reduced (the scale is decreased), and (ii) when the size of the first area is smaller than the predetermined value, the map is expanded (the scale is increased). Here, for example, (1) the area of the first area, (2) the radius of the first area when the first area is a circle, (3) when the first area has an indefinite shape, the largest value, smallest value, or an average value of distances from the user-specified point to the circumference of the first area can be used as the size of the first area.

According to the present embodiment, it is possible to achieve an area search device for intuitively and dynamically displaying an area boundary that meets conditions in conjunction with user's operation.

It should be noted that in the present embodiment, as same as the first embodiment, conditions for the search scope are not limited to the number of search objects described above, but may be, for example, the total capacity of the search objects (e.g., 10 MB). Moreover, the conditions for the search scope may be the total number of the search objects (e.g., 40), or layer areas may be displayed in gradation. Moreover, as described in the explanation of FIGS. 8A and 8B, the sizes of dynamic areas may be adjusted before displaying.

As mentioned above, according to the present embodiment, it is possible to achieve an area search device and an area search method for intuitively and dynamically displaying an area boundary that meets conditions in conjunction with user's operations.

Thus, the area search devices and area search methods according to one or more aspects of the present invention are described based on the embodiments. However, the present invention is not limited to these embodiments. Modifications obtained by making various modifications which those skilled in the art would conceive to the embodiments, or other embodiments which are achieved by combining structural elements in the different embodiments may be included in one of the present invention or several aspects, without materially departing from the scope of the present invention.

Moreover, in the embodiments, each structural element may be achieved by making each structural element with a special hardware, or executing software programs suitable for each structural element. A program execution unit such as a CPU or a processor reads out and executes a software program recorded on a recording medium such as a hard disk or a semiconductor memory, so that each structural element may be achieved. Here, software programs that achieve, for example, the dynamic area search device according to the embodiments are the above programs.

Moreover, ways to achieve integration are not limited to LSI, and a special circuit or a general purpose processor may also achieve the integration. Field Programmable Gate Array (FPGA) that can be programmed after manufacturing LSI or a reconfigurable processor that allows re-configuration of the connection or configuration of a circuit cell in LSI can be used.

Furthermore, if integrated circuit technology that replaces LSI appears through progress in the semiconductor technology or other derived technology, then of course, functional blocks may be integrated using that technology. Application of the biotechnology would be possible.

INDUSTRIAL APPLICABILITY

The present invention can be used for an area search device and an area search method, and more particularly for cellular phones, digital televisions, vehicle-installed terminals, touch panels and so on for viewing and checking information on a map.

REFERENCE SIGNS LIST 100, 200 dynamic area search device
101, 201 dynamic area search user interface
102 detection unit
103 on-map operation detection unit
104 changeable area determination unit
105 current center location detection unit
106 content search unit
107 display area determination unit
108, 110 area boundary display unit
109 search condition obtainment unit
169a, 170a, 170b, 170c, 190b, 170d, 170e, 190a, 190b, 251a, 251b,
251c user-specified point
160b, 160c, 192b, 192c, 197a, 197b, 251d touch gesture operation
161, 161a, 162, 162a, 162b, 171, 171a, 171b, 172, 173, 180, 184, 184a, 185, 185a, 191, 191a area
170, 230 display
183, 194, 195, 196a, 196b, 199a, 199b, 199e, 252, 252b dynamic area
198a, 198b scroll operation
199c, 199f layer area
202 on-map operation processing unit
203 content area operation processing unit
204 determination unit
210 dynamic matching unit
212 content area operation detection unit
214 display size determination unit
216 list information item number calculation unit
218 scroll operation determination unit
220 display content determination unit
222 content area display unit
231 scroll
232 content area
234 map area
253 arrow icon
300 system
320 query tool
330 content database
340 map database
360 computer

The invention claimed is:

1. An area search device comprising:
a search condition obtainment unit configured to obtain information on search objects and a condition for a search scope for searching for the search objects, the information and the condition being inputted by a user;
a detection unit configured to detect a first user-specified point on a map displayed on a display that is a point specified by a user;
a content search unit configured to search for elements associated with locations on the map, based on the information on the search objects;

a determination unit configured to determine a first area that has the first user-specified point at the center, and includes, among the elements searched for by the content search unit, elements that meet the condition for the search scope;

an area boundary display unit configured to dynamically display, on the map, the first user-specified point and the first area determined by the determination unit;

a content area display unit configured to display, in a content area of the display, list information items indicating elements included in the first area displayed by the area boundary display unit;

a content area operation detection unit configured to detect a user operation on the content area, performed as a touch gesture on the list information items displayed; and a display content determination unit configured to further determine an updated number of the list information items to be displayed in the content area and a display size of each of the list information items, based on the user operation detected by the content area operation detection unit, wherein the content area display unit is configured to display, in the content area of the display, the updated number of list information items, the number and the display size of which are determined by the display content determination unit, the search condition obtainment unit is configured to further update the condition for the search scope to search for the search objects so as to include only the elements that correspond to the list information items displayed by the content area display unit, the determination unit is configured to determine a second area having a number of elements corresponding to the updated number of list information items that has the first user-specified point at the center and includes, among the elements searched for by the content search unit, elements that meet the condition for the search scope updated by the search condition obtainment unit, and the area boundary display unit is configured to dynamically display, on the map, the first user-specified point and the second area determined by the determination unit.

2. The area search device according to claim 1,
wherein the condition for the search scope is the number of the search objects, and
the determination unit is configured to determine the first area that has the user-specified point at the center and includes, among the elements searched for by the content search unit, elements, the number of which is identical to the number of the search objects.

3. The area search device according to claim 2,
wherein the condition for the search scope is the number of the search objects,
the determination unit is configured to determine (i) the first area that has the user-specified point at the center and includes, among the elements searched for by the content search unit, elements of the total number of the search objects and (ii) layer areas each including a fixed number of elements which is within the total number of the search objects, and
the area boundary display unit is configured to dynamically display, on the map, the user-specified point and the layer areas determined by the determination unit.

4. The area search device according to claim 1,
wherein the condition for the search scope is a total amount of information of the search objects, and the determination unit is configured to determine the first area that has the user-specified point at the center and includes, among the elements searched for by the content search unit, elements, a total amount of information of which is identical to the total amount of information of the search objects.

5. The area search device according to claim 1,
wherein the determination unit is configured to determine a circle area having the user-specified point at the center as the first area.

6. The area search device according to claim 1,
wherein the map is a geographical map, and
the determination unit is configured to determine, as the first area, an area that has the user-specified point at the center and boundary points at geographically same distances from the user-specified point.

7. The area search device according to claim 1,
wherein the detection unit is configured to further detect an area size changing operation that indicates expansion or reduction of the first area on the map, the first area being displayed on the display by the area boundary display unit,
when the detection unit detects the area size changing operation, the search condition obtainment unit is configured to update the condition for the search scope to search for the search objects so as to respond to the area size changing operation,
the determination unit is configured to determine a third area that has the user-specified area at the center and includes, among the elements searched for by the content search unit, elements that meet the condition for the search scope updated by the search condition obtainment unit, and
the area boundary display unit is configured to dynamically display, on the map, the first user-specified point and the third area determined by the determination unit to expand or reduce the first area on the map displayed on the display.

8. The area search device according to claim 7,
wherein the display is a touch screen display,
the detection unit is configured to detect a user operation on the display by detecting the area size changing operation on the touch screen display, and
the area size changing operation is an operation to perform a touch gesture to expand or reduce the first area on the map displayed on the display while performing a touch gesture to press the first user-specified point.

9. The area search device according to claim 1,
wherein the detection unit is configured to detect, on the map displayed on the display, a second user-specified point that is a point different from the first user-specified point and is a point specified by a user,
the determination unit is configured to determine a third area that has the second user-specified point at the center and includes, among the elements searched for by the content search unit, the elements that meet the condition for the search scope, and
the area boundary display unit is configured to dynamically display, on the map, the second user-specified point and the third area determined by the determination unit.

10. The area search device according to claim 9,
wherein (i) when dynamically displaying, on the map, the first user-specified point and the first area determined by the determination unit, the area boundary display unit is configured to display the condition for the search scope in the first area, and (ii) when dynamically displaying, on the map, the third user-specified point and the second area determined by the determination unit, the area boundary display unit is configured to display the condition for the search scope in the third area.

11. The area search device according to claim 1, wherein the detection unit is configured to further detect, on the map displayed on the display, a second user-specified point that is a point different from the first use-specified point and is a point specified by the user, the determination unit is configured to further determine a third area that has the second user-specified point at the center and includes, among the elements searched for by the content search unit, elements that meet the condition for the search scope, and the area boundary display unit is configured to dynamically display, on the map, the second user-specified point and the third area determined by the determination unit, together with the first user-specified point and the first area determined by the determination unit.

12. The area search device according to claim 1, wherein the area boundary display unit is configured to (i) reduce the map when a size of the first area is a predetermined value or more, and to (ii) expand the map when the size of the first area is smaller than the predetermined value.

13. The area search device according to claim 1, wherein the display content determination unit is configured to determine an initial number and display size of the list information items to be displayed in the content area, based on the number of the elements included in the first area displayed by the area boundary display unit, and the content area display unit is configured to display, in the content area of the display, the list information items, the initial number and display size of which are determined by the display content determination unit.

14. The area search device according to claim 1, wherein a first user operation detected by the content area operation detection unit is a scroll operation which allows the user to scroll the list information items displayed in the content area, the display content determination unit is configured to further determine the number and the display size of the list information items to be displayed in the content area, based on a second user operation detected by the content area operation detection unit, and the content area display unit is configured to display, in the content area of the display, the list information items scrolled in the scroll operation, the number and the display size of which are determined by the display content determination unit.

15. The area search device according to claim 1, wherein the area search device further includes the display, the display is a touch screen display, and the detection unit is configured to detect a user operation on the display by detecting an operation on the touch screen display.

16. An area search method comprising:
obtaining information on search objects and a condition for a search scope for searching for the search objects, the information and the condition being inputted by a user;
detecting a first user-specified point on a map displayed on a display that is a point specified by a user;
searching for elements associated with locations on the map, based on the information on the search objects;
determining a first area that has the first user-specified point at the center, and includes, among the elements searched for, elements that meet the condition for the search scope;
dynamically displaying on the map, the first user-specified point and the determined first area;
displaying in a content area of the display, list information items indicating elements included in the displayed first area; and
detecting a user operation on the content area, performed as a touch gesture on the list information items displayed;
determining an updated number of the list information items to be displayed in the content area and a display size of each of the list information items, based on the touch gesture;
displaying in the content area of the display, the updated number of list information items, the number and the display size of which are determined based on the touch gesture;
further updating the condition for the search scope to search for the search objects so as to include only the elements that correspond to the displayed list information items;
determining a second area having a number of elements corresponding to the updated number of list information items that has the first user-specified point at the center and includes, among the elements searched for, elements that meet the condition for the updated search scope, and
dynamically displaying on the map, the first user-specified point and the determined second area.

17. A non-transitory computer readable recording medium storing a program that causes a computer to execute the steps of:
obtaining information on search objects and a condition for a search scope for searching for the search objects, the information and the condition being inputted by a user;
detecting a first user-specified point on a map displayed on a display that is a point specified by a user;
searching for elements associated with locations on the map, based on the information on the search objects;
determining a first area that has the first user-specified point at the center, and includes, among the elements searched for, elements that meet the condition for the search scope;
dynamically displaying on the map, the first user-specified point and the determined first area;
displaying in a content area of the display, list information items indicating elements included in the displayed first area;
detecting a user operation on the content area, performed as a touch gesture on the list information items displayed;
determining an updated number of the list information items to be displayed in the content area and a display size of each of the list information items, based on the touch gesture;
displaying in the content area of the display, the updated number of list information items, the number and the display size of which are determined based on the touch gesture;
further updating the condition for the search scope to search for the search objects so as to include only the elements that correspond to the displayed list information items;
determining a second area having a number of elements corresponding to the updated number of list information items that has the first user-specified point at the center and includes, among the elements searched for, elements that meet the condition for the updated search scope; and dynamically displaying on the map, the first user-specified point and the determined second area.

18. An integrated circuit comprising:
a search condition obtainment circuit configured to obtain information on search objects and a condition for a search scope for searching for the search objects, the information and the condition being inputted by a user;
a detection circuit configured to detect a first user-specified point on a map displayed on a display that is a point specified by a user;
a content search circuit configured to search for elements associated with locations on the map, based on the information on the search objects;
a determination circuit configured to determine a first area that has the first user-specified point at the center, and includes, among the elements searched for by the content search circuit, elements that meet the condition for the search scope;
an area boundary display circuit configured to dynamically display, on the map, the first user-specified point and the first area determined by the determination circuit;
a content area display circuit configured to display, in a content area of the display, list information items indicating elements included in the first area displayed by the area boundary display unit;
a content area operation detection circuit configured to detect a user operation on the content area, performed as a touch gesture on the list information items displayed; and a display content determination circuit configured to further determine an updated number of the list information items to be displayed in the content area and a display size of each of the list information items, based on the user operation detected by the content area operation detection circuit, wherein the content area display circuit is configured to display, in the content area of the display, the updated number of list information items, the number and the display size of which are determined by the display content determination circuit, the search condition obtainment circuit is configured to further update the condition for the search scope to search for the search objects so as to include only the elements that correspond to the list information items displayed by the content area display circuit, the determination circuit is configured to determine a second area having a number of elements corresponding to the updated number of list information items that has the first user-specified point at the center and includes, among the elements searched for by the content search circuit, elements that meet the condition for the search scope updated by the search condition obtainment circuit, and the area boundary display circuit is configured to dynamically display, on the map, the first user-specified point and the second area determined by the determination circuit.

* * * * *